United States Patent
Chen et al.

(10) Patent No.: US 12,176,512 B2
(45) Date of Patent: Dec. 24, 2024

(54) AMBIENT-PRESSURE REGENERATION OF DEGRADED LITHIUM-ION BATTERY CATHODES

(71) Applicant: THE REGENTS OF THE UNIVERSITY OF CALIFORNIA, Oakland, CA (US)

(72) Inventors: Zheng Chen, San Diego, CA (US); Yang Shi, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 638 days.

(21) Appl. No.: 17/438,397

(22) PCT Filed: Mar. 11, 2020

(86) PCT No.: PCT/US2020/022181
§ 371 (c)(1),
(2) Date: Sep. 10, 2021

(87) PCT Pub. No.: WO2020/185958
PCT Pub. Date: Sep. 17, 2020

(65) Prior Publication Data
US 2022/0199966 A1    Jun. 23, 2022

Related U.S. Application Data
(60) Provisional application No. 62/816,816, filed on Mar. 11, 2019.

(51) Int. Cl.
*H01M 4/04* (2006.01)
*H01M 4/505* (2010.01)
(Continued)

(52) U.S. Cl.
CPC .......... *H01M 4/0471* (2013.01); *H01M 4/505* (2013.01); *H01M 4/525* (2013.01); *H01M 10/54* (2013.01)

(58) Field of Classification Search
CPC .... H01M 4/0471; H01M 4/505; H01M 4/525; H01M 4/131; H01M 4/1391;
(Continued)

(56) References Cited

U.S. PATENT DOCUMENTS 9,484,606 B1 * 11/2016 Sloop .................... H01M 10/54
2005/0241943 A1 * 11/2005 Kakuta ................. H01M 10/52
205/59
(Continued)

FOREIGN PATENT DOCUMENTS

CN       104051727 B     5/2016
WO       2019/136397 A1  7/2019

OTHER PUBLICATIONS

PCT/US2020/022181 International Search Report and Written Opinion, May 7, 2020,.
(Continued)

*Primary Examiner* — Matthew W Van Oudenaren
(74) *Attorney, Agent, or Firm* — Eleanor Musick; Torrey Pines Law Group PC

(57) ABSTRACT

A method for direct recycling of degraded lithium-ion battery (LIB) cathodes includes relithiating degraded lithium nickel cobalt manganese oxide (NCM) by mixing the cathode particles with a eutectic molten-salt solution and heating the mixture at ambient pressure over a period of time, followed by a short-time thermal annealing. Combining low-temperature relithiation using the eutectic molten-salt solution with thermal annealing provides successful regeneration and full recovery of the LIB to its original storage capacity, cycling stability and rate capability to the (Continued)

levels of the pristine materials. The method is useful to recycle and remanufacture degraded cathode materials for LIB or sodium-ion batteries.

24 Claims, 21 Drawing Sheets

(51) Int. Cl.
  *H01M 4/525* (2010.01)
  *H01M 10/54* (2006.01)
(58) Field of Classification Search
  CPC ........... H01M 4/1315; H01M 4/13915; H01M 10/54; H01M 10/0525; H01M 10/42; H01M 2004/028
  See application file for complete search history.

(56) References Cited

U.S. PATENT DOCUMENTS

2014/0166501 A1* 6/2014 Awazu ............... C25C 3/34
                                                    205/771
2021/0111445 A1 4/2021 Chen et al.

OTHER PUBLICATIONS

Hwang, J.-Y., et al., Radially aligned hierarchical columnar structure as a cathode material for high energy density sodium-ion batteries, Nature Communications, Apr. 2015, vol. 6:6865, 9 pages.
Shi, Y., et al., Effective regeneration of LiCoO2 from spent lithium-ion batteries: a direct approach towards high-performance active particles, Green Chemistry, Jan. 18, 2018, vol. 20, 851-862.

* cited by examiner

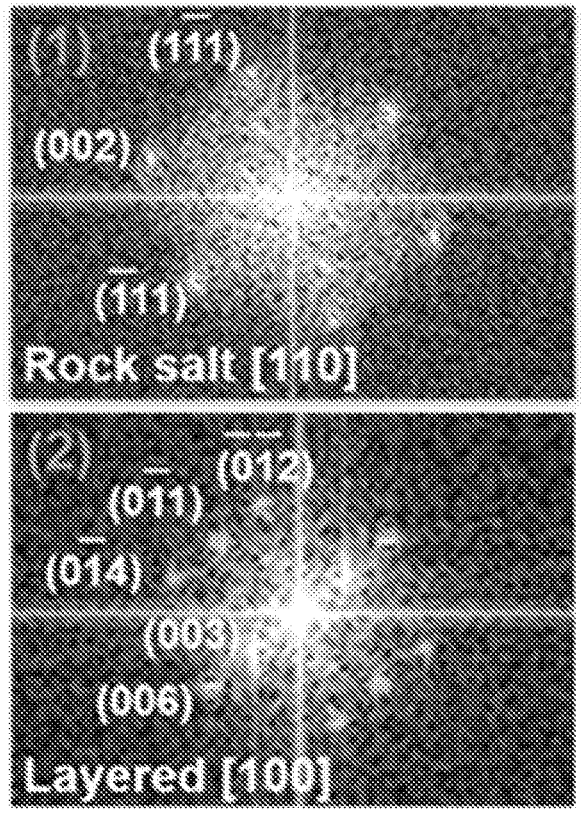
FIG. 7C
FIG. 7D
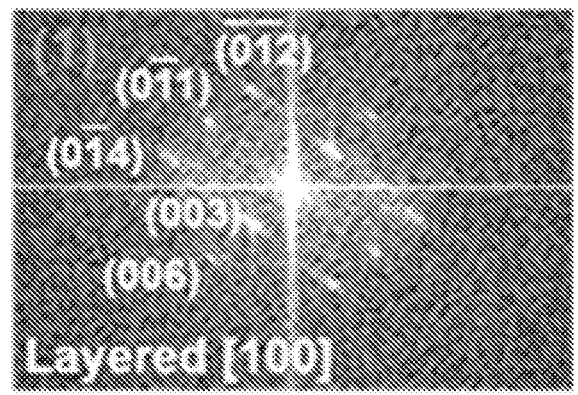
FIG. 7E
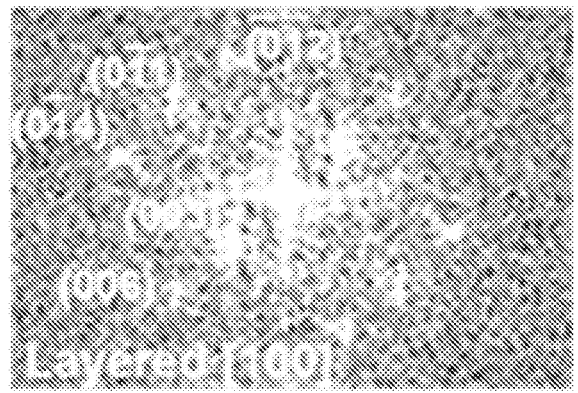
FIG. 7F

AMBIENT-PRESSURE REGENERATION OF DEGRADED LITHIUM-ION BATTERY CATHODES

RELATED APPLICATIONS

This application is a 371 national stage filing of International Application No. PCT/US2020/022181, filed Mar. 11, 2020, which claims the benefit of the priority of U.S. application No. 62/816,816, filed Mar. 11, 2019, the contents of which are incorporated herein by reference in their entirety.

GOVERNMENT RIGHTS

This invention was made with government support under Grant CBET-1805570 awarded by the National Science Foundation. The government has certain rights in the invention.

FIELD OF THE INVENTION

The present invention relates to a method for recycling and re-use of end-of-life lithium ion batteries to reclaim lithium and transition metal resources.

BACKGROUND

Lithium-ion batteries (LIBs) offer high energy density (260 Wh kg$^{-1}$ and 700 Wh L$^{-1}$ at cell level), high Coulombic efficiency (99.98%) and long cycling life (>1000 cycles), making them the dominating power sources for portable electronics and electric vehicles (EVs). Due to the rapid growth of these markets, the worldwide manufacturing capacity of LIBs is expected to have an expansion reaching hundreds of GWh per year in the next five years. In this context, recycling and re-use of end-of-life LIBs (after 5 to 10 years of operation) to reclaim lithium (Li) and transition metal (TM) resources (e.g., Cobalt (Co) and Nickel (Ni)), as well as eliminating pollution from disposal of waste batteries, has become an urgent task.

Great effort has been made toward the recycling of LIB cathode materials due to the fact that the majority of the battery value is embedded in the cathode materials; although it is still the ultimate goal to fully recycle every component in the used batteries. The state-of-the-art approaches to recycle cathode materials include pyrometallurgy, hydrometallurgy, and direct recycling. The pyrometallurgical approach requires high temperature smelting as well as multi-step purification and separation processes, while the hydrometallurgical approach requires acid leaching and subsequent complicated precipitation steps to produce precursors for the re-synthesis of new cathode materials. Both approaches destroy the LIB cathode particles (e.g., well-tuned secondary particle structures), which represent a significant amount of value due to the embedded energy from their primary manufacturing process.

Different from the above methods, the direct recycling approach combines a physical separation process to harvest the cathode materials with a post-treatment process (e.g., relithiation, annealing) to heal the compositional and structural defects of the electrode particles, which leads to regenerated cathodes that can be readily used for making new cells. With appropriate conditions, directly regenerated cathode materials may exhibit high specific capacity, high cycling stability and high rate capability reaching that of pristine materials but with significantly reduced cost. However, relithiation of degraded Li-deficient cathode particles often requires high-temperature and/or high pressure operation to achieve a stoichiometric ratio of Li in the cathode, which greatly increases the cost of regeneration.

Lithium nickel cobalt manganese oxide (NCM), and more specifically LiNi$_{0.5}$Co$_{0.2}$Mn$_{0.3}$O$_2$ (NCM523), is one of the predominant cathode materials in state-of-the-art LIBs due to its relatively high energy density and low cost (particularly when compared with LiCoO$_2$ and LiNi$_{1/3}$Co$_{1/3}$Mn$_{1/3}$O$_2$), as well as its balance in the property matrix including cycling performance, rate capacity and thermal stability. It is commonly recognized that Li loss is one of the major issues responsible for capacity degradation of NCM-based cathodes. As Li is lost, the TM cations (e.g., Ni$^{2+}$) start to migrate between the layers, which slowly induces unfavorable phase changes. Since Ni$^{2+}$ and Li$^+$ have similar sizes, a higher Ni concentration in the NMC cathode will likely result in more severe irreversible structure change. Accordingly, it poses a greater challenge to directly regenerate and recover the electrochemical properties of degraded cathodes with higher Ni content, such as NCM523. In previous efforts, a hydrothermal relithiation process was integrated with a short annealing step to fully resolve the compositional and structural defects in degraded NCM cathodes, resulting in the successful recovery of the original stoichiometric composition, layered structure and electrochemical performance of pristine NCM523 cathodes. While the process is relatively simple, a high-pressure hydrothermal reaction (220° C. and 10 MPa) is required, and additional cost may be incurred to mitigate potential safety concerns. Therefore, it is of great interest to develop a safer, scalable, low-cost and environmentally-friendly approach to regenerate degraded NCM cathode materials.

SUMMARY

Methods are provided for energy efficient recycling and re-manufacturing of spent and degraded lithium-ion battery (LIB) cathodes by mixing cathode particles with a eutectic molten-salt solution and heating the mixture at ambient pressure. The methods reduce the overall cost of recycling LIBs and improve the materials' sustainability.

In embodiments of the invention, methods, materials, articles of manufacture, and systems are provided for energy-efficient, low-cost and sustainable recycling and re-manufacturing of spent and degraded lithium-ion battery (LIBs) cathodes. Ambient-pressure relithiation of degraded Li-deficient lithium nickel cobalt manganese oxide (NCM) particles is achieved via eutectic Li solutions by combining the degraded NCM particles in a low-temperature molten-salt reaction at ambient-pressure, followed by a short-time thermal annealing, to directly regenerate degraded cathode particles. Systematic characterization suggests that the chemical composition (e.g., Li content) and bulk crystal structures can be recovered from this regeneration process. Moreover, the surface rock salt phase (NiO-like) that is formed due to long-term cycling can be also converted to the original layered phase, accompanied by the changes in oxidation states of TMs. With the successful revival of their composition and structure, the LIB storage capacity, cycling stability and rate capability of the degraded NCM cathode particles can be recovered to the original levels of the pristine materials, suggesting the promise of using this new method to recycle and re-manufacture degraded LIB cathodes. In addition, this work may also provide a unique platform to further study reversible chemistry in various solid-state ionic materials.

This approach provides distinct advantages over traditional pyrometallurgical and hydrometallurgical methods, as well as direct recycling methods that require high-pressure. The pyrometallurgical approach requires high temperature smelting as well as multi-step purification and separation processes; and the hydrometallurgical approach requires acid leaching and subsequent complicated precipitation steps to produce precursors for the re-synthesis of new cathode materials. Both approaches totally destroy the LIB cathode particles (e.g., well-tuned secondary particle structures), which represent a significant value due to the embedded energy from their primary manufacturing process. The high-pressure direct recycling approach combines a physical separation process to harvest the cathode materials with a high-pressure relithiation process to regenerate cathode materials, but the high pressure operation greatly increases the cost of regeneration.

In contrast, the approach described herein is non-destructive, effective, energy efficient, environmentally-friendly, and easy for mass production in industry. The approach combines a physical separation process to harvest the cathode materials with a post-treatment process (e.g., relithiation, annealing) to heal the compositional and structural defects of the electrode particles, which leads to regenerated cathodes that can be readily used for making new cells.

In one embodiment, a method of regenerating degraded lithium-ion battery cathode materials at ambient pressure comprises: mixing a eutectic molten salt solution with degraded lithium-ion cathode materials to form a mixture; heating the mixture at ambient pressure to relithiate the degraded lithium-ion cathode materials; and thermally annealing the relithiated mixture.

In another embodiment, a method for recycling spent lithium-ion batteries comprises: harvesting degraded lithium-ion cathode materials from batteries; mixing the cathode materials with a eutectic molten salt solution to form a mixture; heating the mixture at ambient pressure to relithiate the degraded lithium-ion cathode materials; and thermally annealing the cathode materials for a pre-determined period of time.

In a further embodiment, a method of regenerating degraded sodium-ion battery cathode materials at ambient pressure comprises: mixing a eutectic molten salt solution with degraded sodium-ion cathode materials to form a mixture; heating the mixture at ambient pressure to resodiate the degraded sodium-ion cathode materials; and thermally annealing the resodiated mixture.

BRIEF DESCRIPTION OF THE DRAWINGS

FIGS. 7C, 7D, 7E and 7F are HRTEM images which illustrate microphase changes from the degraded and regenerated NCM particles, according to one embodiment of the invention;

DETAILED DESCRIPTION OF EMBODIMENTS

Methods are described herein for direct recycling of degraded lithium-ion batteries (LIBs) via ambient-pressure relithiation of degraded lithium nickel cobalt manganese oxide (NCM). Degraded NCM is mixed with a eutectic molten-salt solution and heated at ambient pressure for a period of time, followed by a short thermal annealing. Combining low-temperature relithiation using the eutectic molten-salt solution with thermal annealing provides successful regeneration and full recovery of the LIB to its original storage capacity, cycling stability and rate capability.

Figure 1:
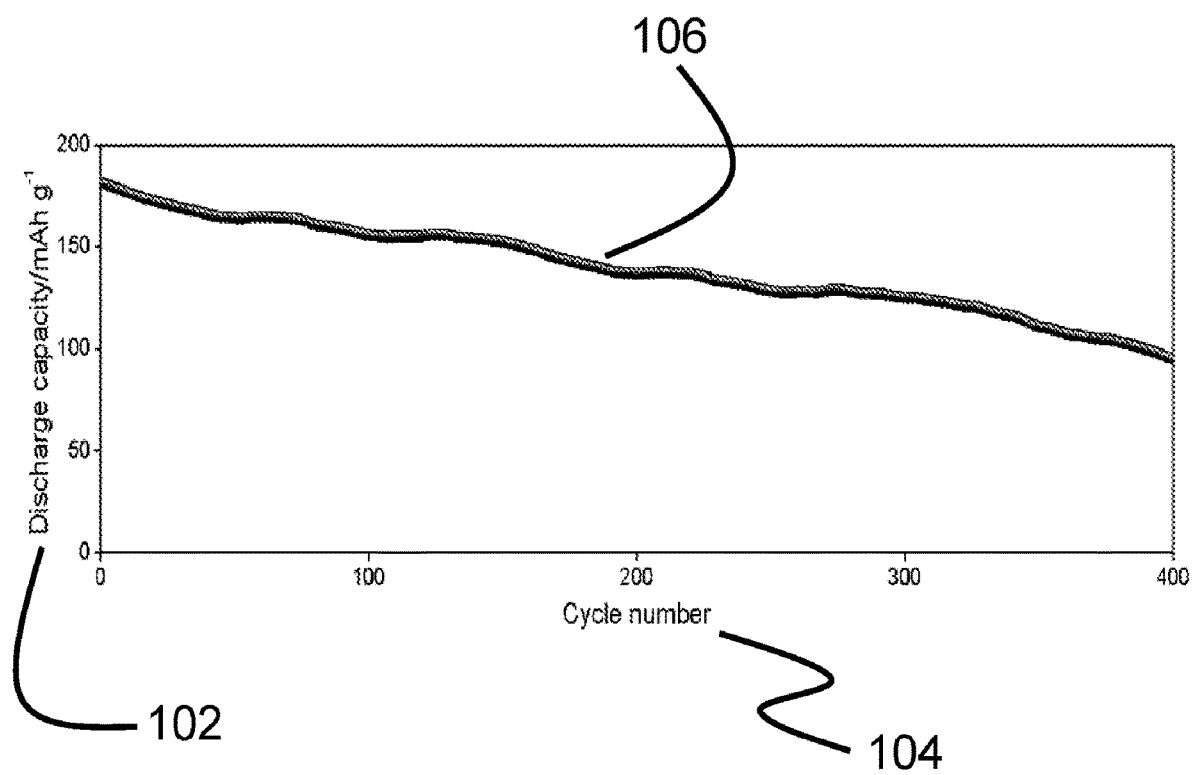
FIG. 1 is a graph plotting a cycling performance of lithium nickel cobalt manganese oxide (NCM) cathodes, as known in the art.

It is commonly considered that a LIB cell approaches the end of its life once more than 20% of capacity loss is reached. Secondary use of such degraded batteries is possible for maximizing the value of cells since a considerable amount of capacity may remain useful for other purposes such as back-up power sources. However, in order to demonstrate the effectiveness and robustness of the cathode regeneration process, more than 20% of capacity degradation was induced. The inventive methods are effective on batteries with a capacity degradation of approximately 40%-80%. In one experiment, commercial pouch cells with $LiNi_{0.5}Co_{0.2}Mn_{0.3}O_2$ (NCM523) cathodes were cycled in the voltage range of 3-4.5 volts (V) at 1 degree Celsius (° C.) for 400 cycles to achieve, as shown by the comparison of discharge capacity 102 with a number of cycles 104 in FIG. 1, a capacity degradation 106 of 48%. Correspondingly, significant lithium ion ($Li^+$) loss (40%) was identified in cathode materials after cycling, as revealed by inductively coupled plasma-optical emission spectrometry (ICP-OES), although these methods are effective on batteries with $Li^+$ loss of approximately 20%-60%. To regenerate the degraded cathode materials and revitalize their electrochemical activity, both the composition (e.g., $Li^+$ loss) and structure defects (e.g., phase changes) resulting from long-term cycling need to be resolved. While previous work on hydrothermal relithiation can successfully reach stoichiometric composition, such a relithiation process brings up concerns for large scale operation due to the required high pressure. To mitigate this potential issue, it is desirable to develop an ambient-pressure relithiation strategy.

A eutectic molten salt mixture is a class of homogenous system that melts or solidifies at a temperature that is lower than the melting point of any constituent salt at normal pressure (a eutectic temperature). These salt mixtures are found to be useful as "solvents" or precursors for many applications, such as thermal energy storage and "solvent-free" chemical reactions. Particularly, Li-based eutectic molten salts have been used as both the Li source and the "solvent" to react with transition metal (TM) precursors for the synthesis of high-performance LIB cathodes. Among different eutectic systems formed by common Li salts, the mixture of lithium nitrate ($LiNO_3$) and lithium hydroxide (LiOH) at a molar ratio of 3:2 is of great interest due to its lowest melting point at approximately 175° C. This type of unique eutectic Li solution system has great potential for relithiation of degraded cathode materials at ambient pressure and low temperature.

Therefore, in embodiments described herein, methods are described to restore the Li composition in degraded NCM cathodes via an eutectic Li-molten salt solution at ambient pressure. These embodiments offer advantages over previous methods which may be only be carried out in high pressure systems, as the present methods are effective at ambient pressure, or approximately 1 standard atmosphere (atm). However, these embodiments are also capable of functioning at higher pressures.

Figure 2:
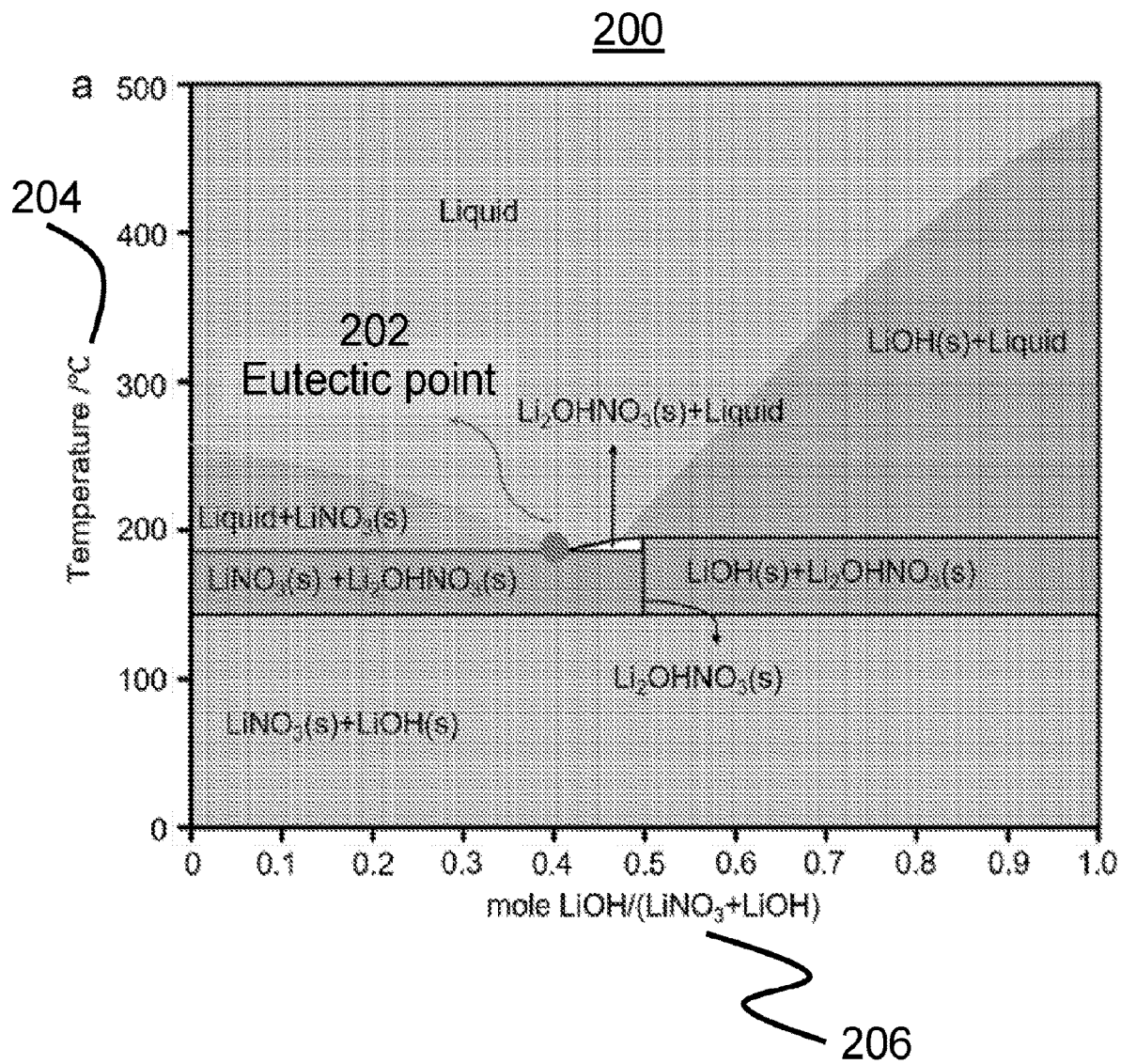
FIG. 2 is a phase diagram of a melting point of a eutectic Li-molten salt solution at ambient pressure, as known in the art.

Li-molten salt solutions based on different Li salts have been explored for electrolytes in LIBs or lithium oxygen batteries. Among these solutions, Li-salt mixtures of $LiNO_3$ and LiOH can form a wide range of eutectic solutions. Especially, when it is composed of LiOH and $LiNO_3$ at a molar ratio of 3:2, its melting (eutectic) point 202 reaches as low as approximately 175° C., as displayed in the phase diagram 200 in FIG. 2 comparing temperature 204 and the molar ratio 206 of the Li salts. Therefore, such a ratio was adopted in the preparation of eutectic molten salt solutions for relithiation of degraded NCM cathodes at ambient pressure.

Figure 3A:
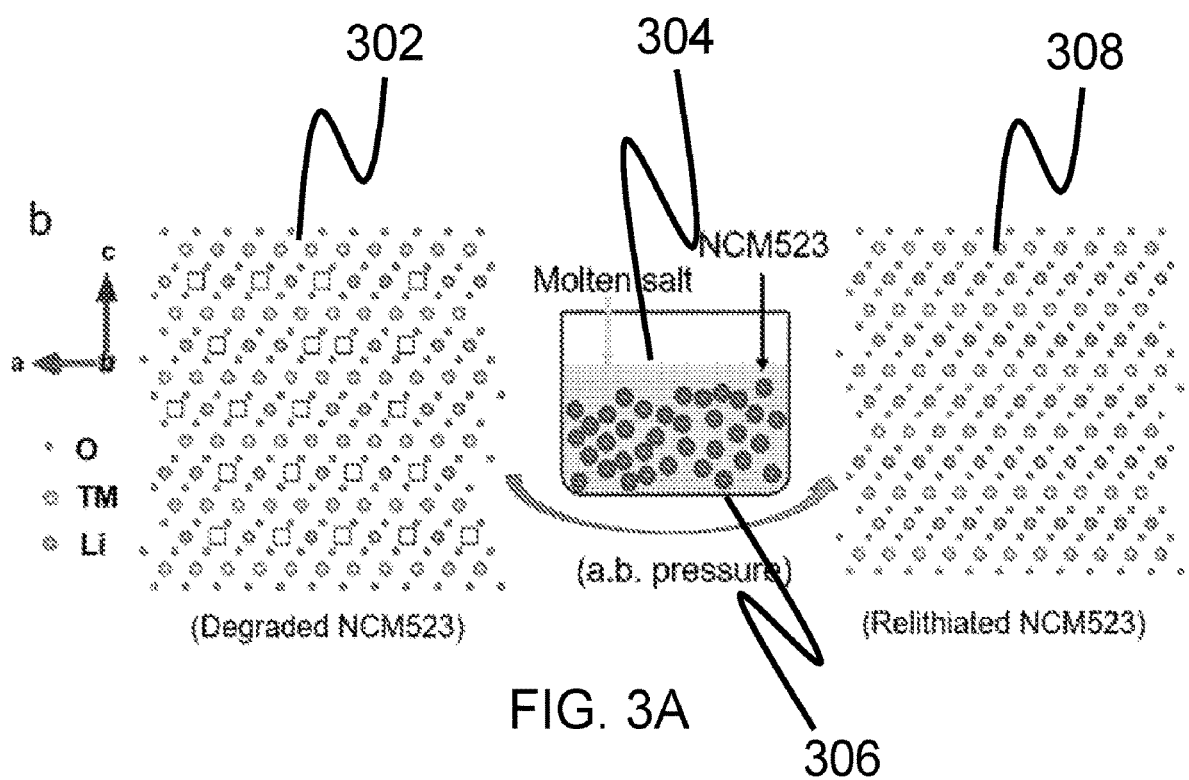
FIG. 3A is an illustration of a relithiation process for Li composition recovery of NCM, according to one embodiment of the invention.
Figure 3B:
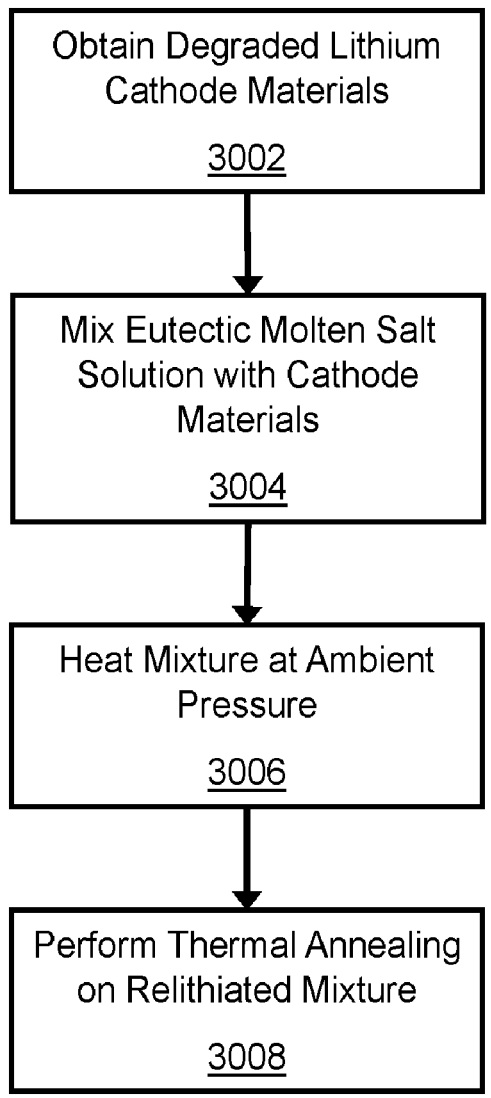
FIG. 3B is a block diagram of a method of ambient pressure relithiation of degraded NCM via the eutectic molten salt solution, according to one embodiment of the invention.

The inventive approach is based on the idea that the eutectic solution with a high $Li^+$ concentration can effectively relithiate the Li-deficient LIB cathodes without using any extra pressure. As illustrated in FIG. 3A and the corresponding block diagram in FIG. 3B, degraded NMC523 particles 302 with Li vacancies are obtained (step 3002) along with a eutectic Li salt mixture 304 of $LiNO_3$ and LiOH at a molar ratio of approximately 3:2. At step 3004, The degraded NCM523 and the molten-salt solution is then mixed. At step 3006, the mixture 306 is then heated to approximately 300° C. at ambient pressure (1 atm) and held for approximately 2 to 4 hours to allow sufficient time for $Li^+$ diffusion through the particles, which results in complete relithiation of the Li-deficient cathode particles and fully-relithiated NCM523 particles 308. A short thermal annealing is performed (step 3008) at a temperature range of approximately 700° C. to 950° C. for approximately 1-12 hours to reach a desired crystallinity. While NCM523 was used in the experiment, the composition of the NCM may have a formula of $LiNi_xCo_yMn_{1-x-y}O_2$ ($0 \le x \le 1$, $0 \le y \le 1$, $0 \le x+y \le 1$) and be one or more of $LiNi_{0.333}Co_{0.333}Mn_{0.333}O_2$ (NCM111), $LiNi_{0.5}Co_{0.2}Mn_{0.3}O_2$ (NCM523), $LiNi_{0.6}Co_{0.2}Mn_{0.2}O_2$ (NCM622), $LiNi_{0.7}Co_{0.1}Mn_{0.2}O_2$, $LiNi_{0.8}Co_{0.1}Mn_{0.1}O_2$ (NCM811), $LiNi_{0.83}Co_{0.12}Mn_{0.05}O_2$, and $LiNi_{0.89}Co_{0.06}Mn_{0.05}O_2$.

Figure 4A:
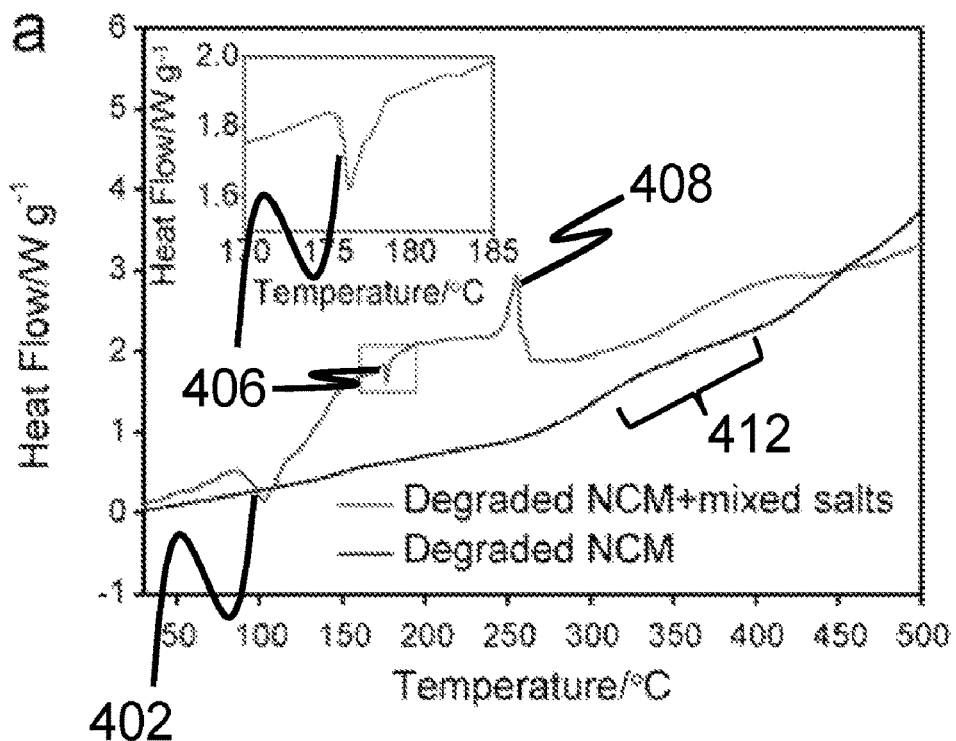
FIG. 4A is a graph which shows differential scanning calorimetry (DSC) curves of degraded NCM particles and degraded NCM particles mixed with a eutectic Li-salt, according to one embodiment of the invention.
Figure 4B:
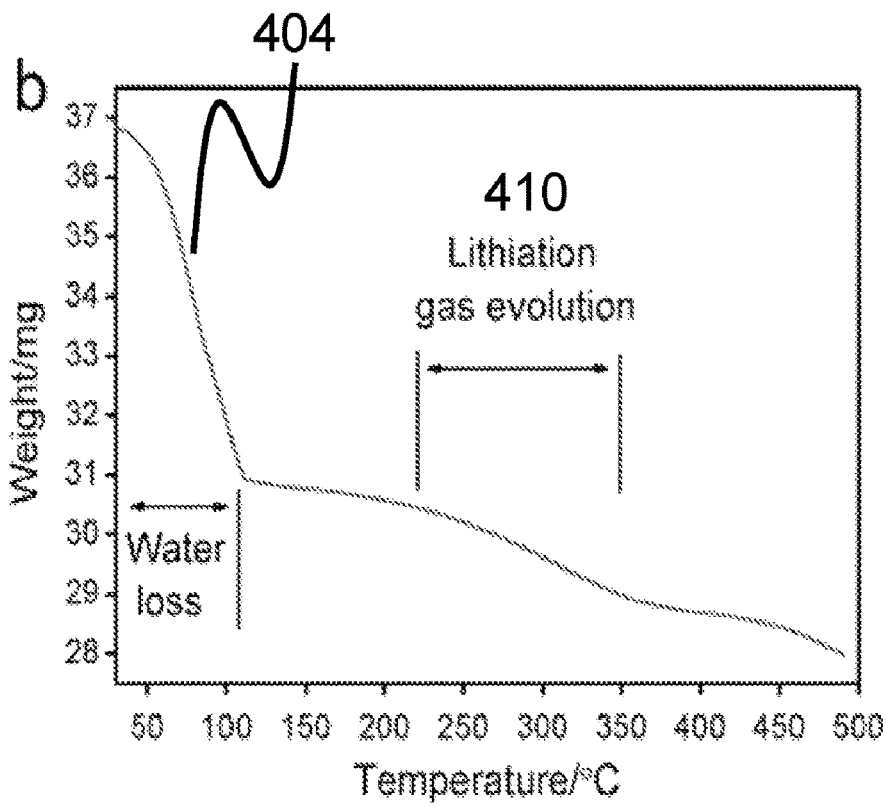
FIG. 4B is a graph of a thermogravimetric analysis (TGA) curve of the mixture of degraded NCM particles and the eutectic Li-salt, according to one embodiment of the invention.

Thermal analysis was first carried out to elucidate the relithiation process of the degraded NCM523 in the eutectic Li molten-salt solution and to determine the appropriate reaction temperature. A differential scanning calorimetry (DSC) analysis was performed on the mixture of degraded particles and eutectic Li salts, as illustrated by the graph in FIG. 4A. The endothermic peak 402 at 100° C. corresponds to the loss of absorbed water from $LiNO_3$ since it is hygroscopic, as revealed in the dramatic weight loss in the TGA curve 404 illustrated in FIG. 4B. A second endothermic peak 406 at 176° C. corresponds to the melting of the eutectic molten salt. The exothermic peak 408 at 250° C. (FIG. 4A) and the corresponding weight loss 410 in the temperature range of 250-350° C. can be ascribed to gas evolution. Possible reactions in this temperature ranges include the lithiation of the degraded cathode materials associated with the generation of $O_2$, water (vapor) and $NO_2$:

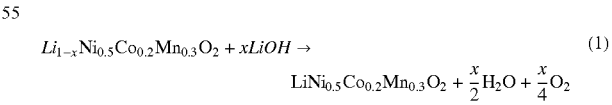
$$Li_{1-x}Ni_{0.5}Co_{0.2}Mn_{0.3}O_2 + xLiOH \rightarrow \quad (1)$$
$$LiNi_{0.5}Co_{0.2}Mn_{0.3}O_2 + \frac{x}{2}H_2O + \frac{x}{4}O_2$$

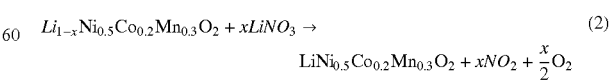
$$Li_{1-x}Ni_{0.5}Co_{0.2}Mn_{0.3}O_2 + xLiNO_3 \rightarrow \quad (2)$$
$$LiNi_{0.5}Co_{0.2}Mn_{0.3}O_2 + xNO_2 + \frac{x}{2}O_2$$

No obvious endothermic or exothermic peaks are observed upon only heating degraded NCM523, though a broad exothermic peak 412 between 300° C. and 400° C. is observed (FIG. 4A), which is due to the oxygen loss of Li-deficient NCM cathode. This result suggests that the lithiation reaction of degraded NCM523 with the eutectic Li-molten salts mainly occurs at ~250° C., therefore a temperature of at least 250° C. and more ideally 300° C. is selected for the relithiation experiment.

With full relithiation, thermal annealing was then performed to promote the crystallization of the particles to form desired layered phase. After complete regeneration, the chemical compositions of the pristine, degraded and regenerated NCM523 cathode materials were determined and compared, as shown below in Table 1.

TABLE 1

ICP-OES results of pristine, cycled and regenerated NCM523 cathode particles

| Sample | Composition |
|---|---|
| Pristine | $Li_{1.009}Ni_{0.492}Co_{0.209}Mn_{0.305}O_{2.015}$ |
| Degraded | $Li_{0.593}Ni_{0.491}Co_{0.202}Mn_{0.301}O_{2.005}$ |
| MS-2 h | $Li_{0.995}Ni_{0.491}Co_{0.209}Mn_{0.302}O_{2.010}$ |
| MS-4 h | $Li_{1.011}Ni_{0.491}Co_{0.208}Mn_{0.304}O_{2.009}$ |
| MS-SA 2 h | $Li_{1.002}Ni_{0.490}Co_{0.210}Mn_{0.302}O_{2.011}$ |
| MS-SA 4 h | $Li_{1.019}Ni_{0.492}Co_{0.209}Mn_{0.303}O_{2.012}$ |

The materials only underwent relithiation with molten salts for 2 hours (h) and 4 hours (h), respectively, and are denoted as "MS-2 h" and "MS-4 h", respectively. The samples with relithiation and short annealing are denoted as "MS-SA 2 h" and "MS-SA 4 h", respectively. The degraded NCM523 material had a Li loss of ~40%, which further confirms that Li loss is the main cause responsible for its capacity loss (48%). While it is very close to the stoichiometric ratio, the Li content of the MS-2 h sample is slightly lower than that of the pristine NCM523 sample, indicating that a longer time is needed to overcome the lithiation kinetics. With 4 h of relithiation with the Li-molten salts (MS-4 h), the Li concentration of the degraded NCM523 particles can be fully recovered to the pristine composition. Note that doubling the relithiation time only led to limited overdosage of Li (1.1%). This result indicates that the relithiation in the eutectic Li salt is a self-saturation process, which agrees with the kinetics observed in the hydrothermal relithiation process. Since 5% of extra was added during the annealing step, both MS-SA 2 h and MS-SA 4 h reached saturated Li ratio with slight overdosage, which is close to the composition in the pristine NCM523 sample.

Figure 5A:
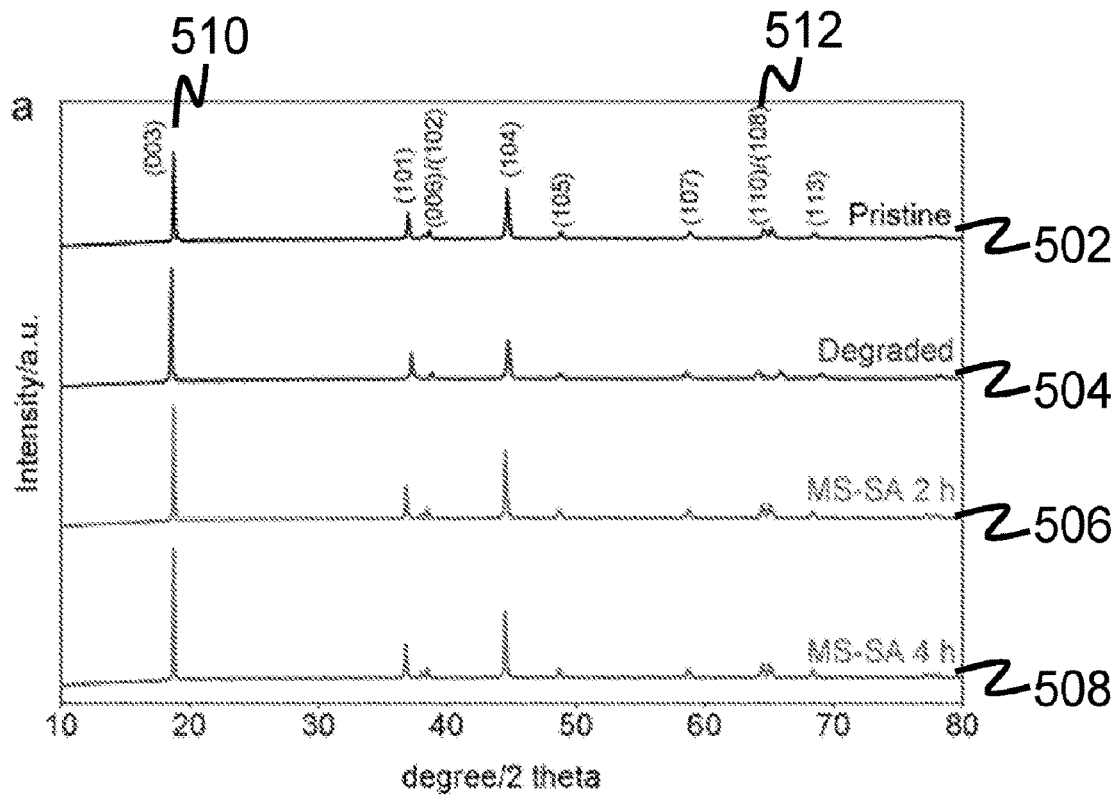
FIGS. 5A and 5B are graphs showing X-ray Powder Diffraction (XRD) patterns of pristine NCM particles, degraded NCM particles and regenerated NCM particles, according to one embodiment of the invention.
Figure 5B:
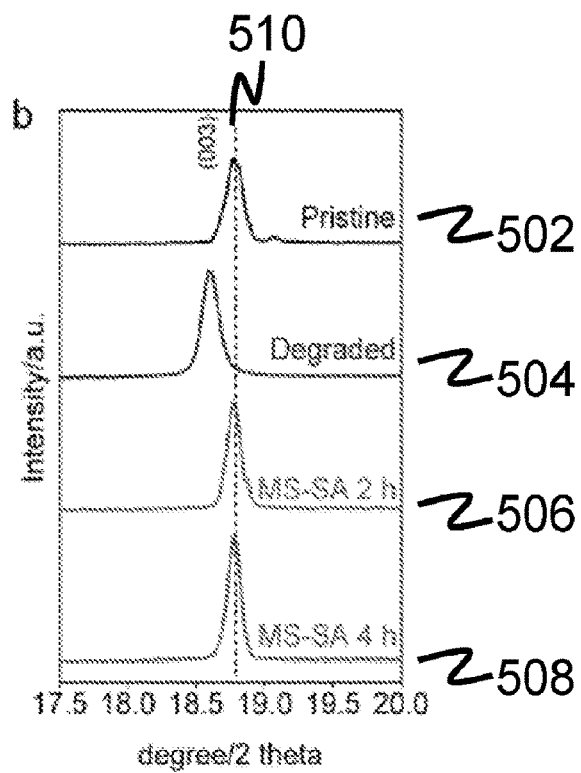

The X-Ray powder diffraction (XRD) patterns of the pristine 502, cycled (degraded) 504 and regenerated NCM523 particles (506—MS-2 h, 508—MS-4 h) are shown in FIG. 5A. All the samples exhibit a typical pattern of α-NaFeO$_2$ structure with R $\overline{3}$ m space group. The cycled particles showed a larger intensity ratio of $I_{003}/I_{104}$ compared with the pristine sample, which is consistent with previous reports. This change may be related to the preferred orientation of certain facets after microstructure changes during cycling. The (003) peak 510 shifted to lower angles, corresponding to an increase in c lattice parameter due to the electrostatic repulsion between the oxygen layers along c directions in the Li-deficient state. The spacing between the peaks in the (108)/(110) doublets 512 increased after cycling, corresponding to the decrease in α lattice parameters due to the smaller effective ionic radii of $Ni^{3+}$ than $Ni^{2+}$ to compensate Li deficiency. As shown in FIG. 5B, after regeneration, the (003) peak 510 shifted back towards higher angles, and in FIG. 5A, the spacing between two doublets peaks 512 decreases, which indicates the recovery of the pristine crystal structure.

Figure 6A:
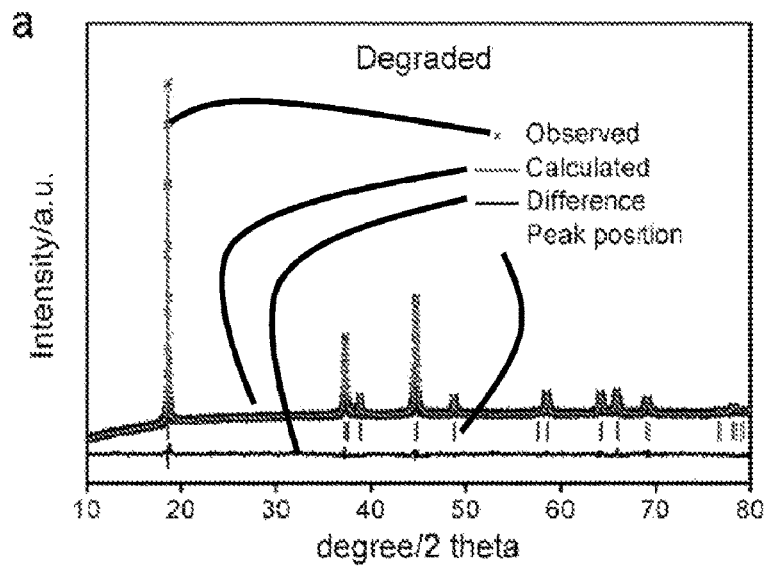
FIGS. 6A-6C are graphs which illustrate results of a Rietveld refinement of the XRD patterns of degraded NCM cathodes, NCM cathodes relithiated for approximately 2 hours and NCM cathodes relithiated for approximately 4 hours, respectively, according to one embodiment of the invention.
Figure 6B:
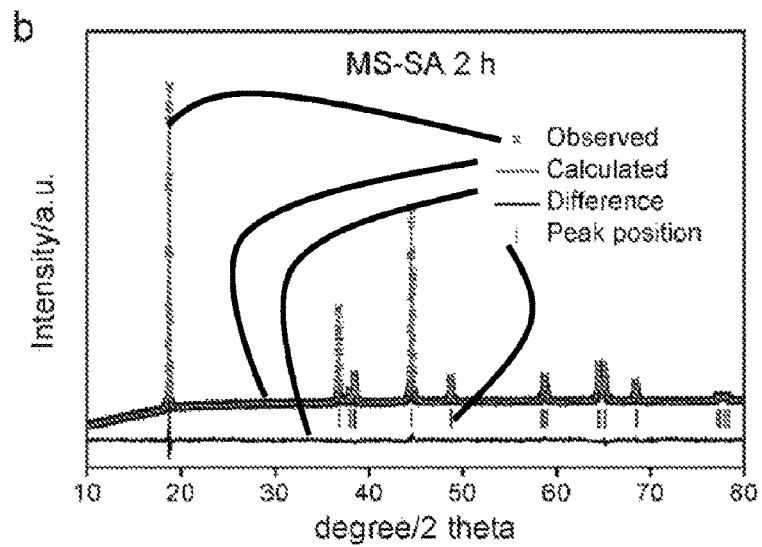
Figure 6C:
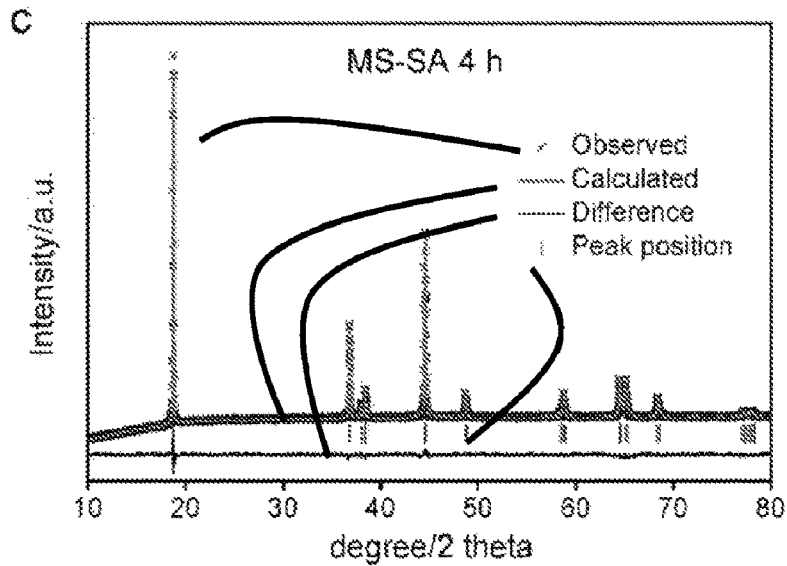

Rietveld refinement was performed on all the XRD patterns of the NCM523 cathodes to provide quantitative structure information, as illustrated by the graph of the degraded cathodes (FIG. 6A), MS-SA 2 h regenerated cathodes (FIG. 6B), and MS-SA 4 h regenerated cathodes (FIG. 6C). The lattice parameters are compared in Table 2.

TABLE 2

Lattice parameters of pristine, cycled and regenerated cathode particles

| Sample | a/Å | c/Å | Li/Ni mixing | $R_B$ | $R_{wp}$ |
|---|---|---|---|---|---|
| Pristine | 2.8689(4) | 14.240(6) | 3.39% | 4.41% | 1.65% |
| Degraded | 2.8397(1) | 14.423(1) | 1.35% | 6.28% | 2.06% |
| MS-SA 2 h | 2.8674(8) | 14.232(4) | 3.62% | 6.31% | 1.83% |
| MS-SA 4 h | 2.8680(0) | 14.231(3) | 2.43% | 5.41% | 1.86% |

The refinement results further confirm that the degraded particles have decreased a lattice parameters and increased c lattice parameters. The Li/Ni mixing in the degraded material was calculated to be lower (1.35%) than the pristine material (3.39%). The value of the cycled material may not reflect the real degree of cation mixing due to the preferred orientation of NCM523 after cycling and this phenomenon will be investigated in our future research. For all the regeneration conditions, the a and c lattice parameters change back to higher and lower values, respectively, suggesting the recovery of the crystal structure. The Li/Ni mixing of MS-SA 4 h sample is lower than that of MS-SA 2 h sample, which is resulted from the longer lithiation time of the former sample, since increased Li content can suppress the cation mixing.

Figure 7A:
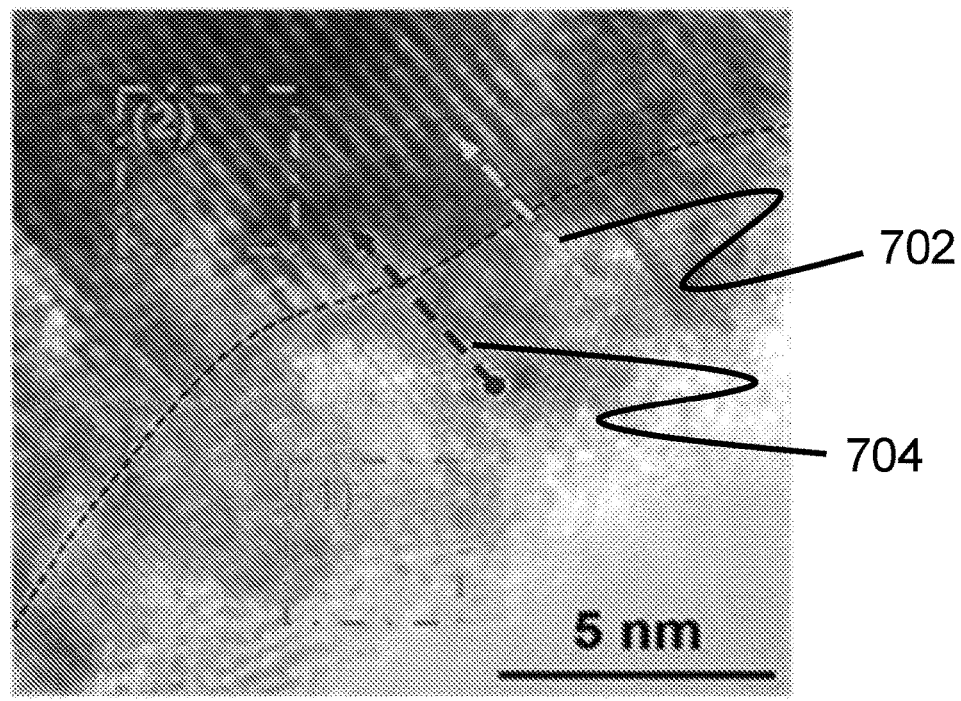
FIGS. 7A and 7B are high-resolution transmission electron microscopy (HRTEM) images of degraded NCM particles and regenerated NCM particles, respectively, according to one embodiment of the invention.
Figure 7B:
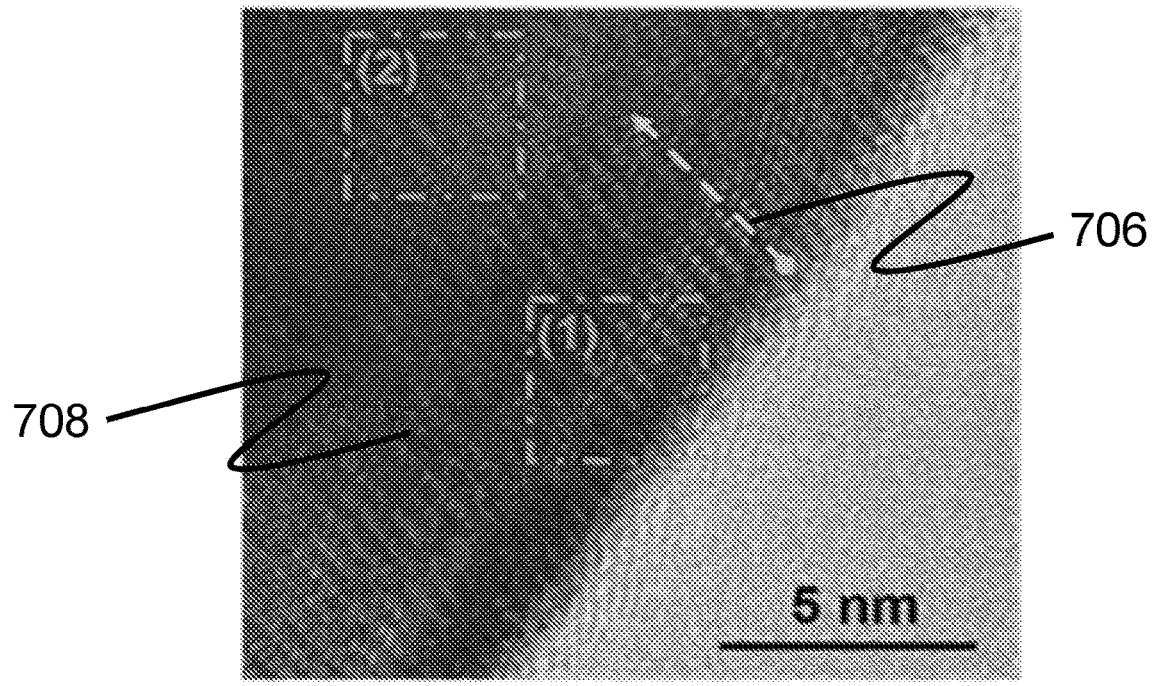
Figure 7G:
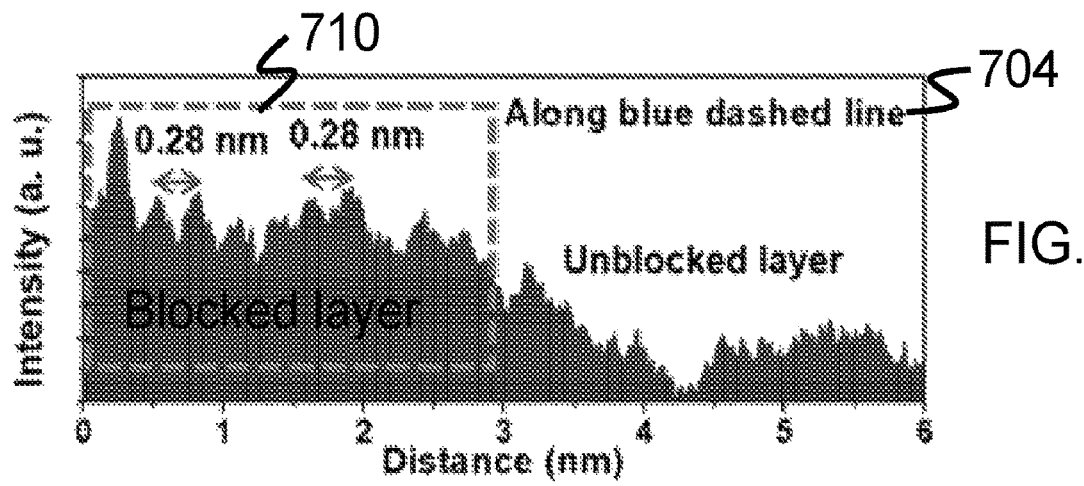
FIGS. 7G, 7H, 7I and 7J are graphs illustrating intensity plots of the microphase changes of the degraded and regenerated NCM particles, according to one embodiment of the invention.
Figure 7H:
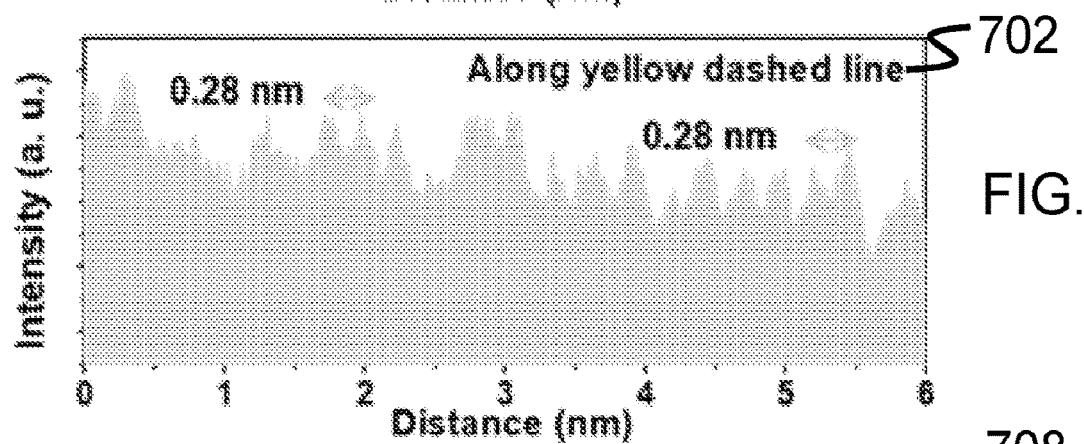
Figure 7I:
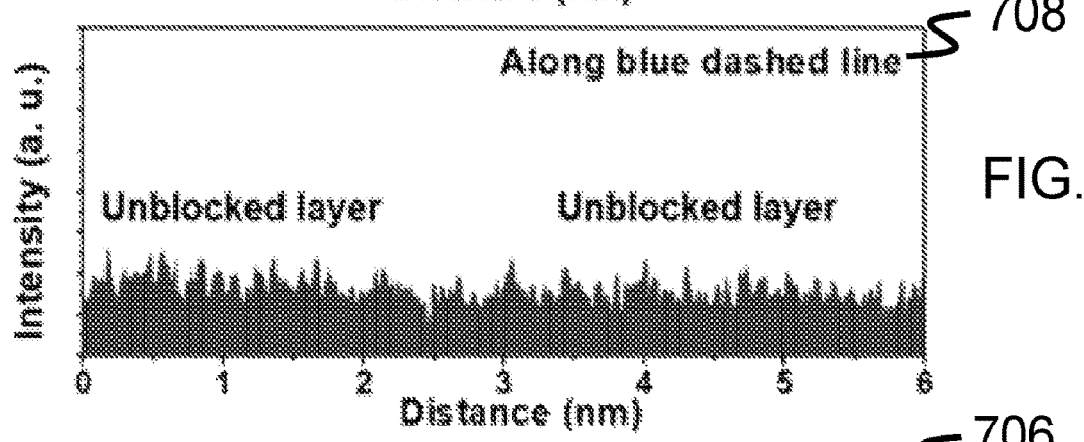
Figure 7J:
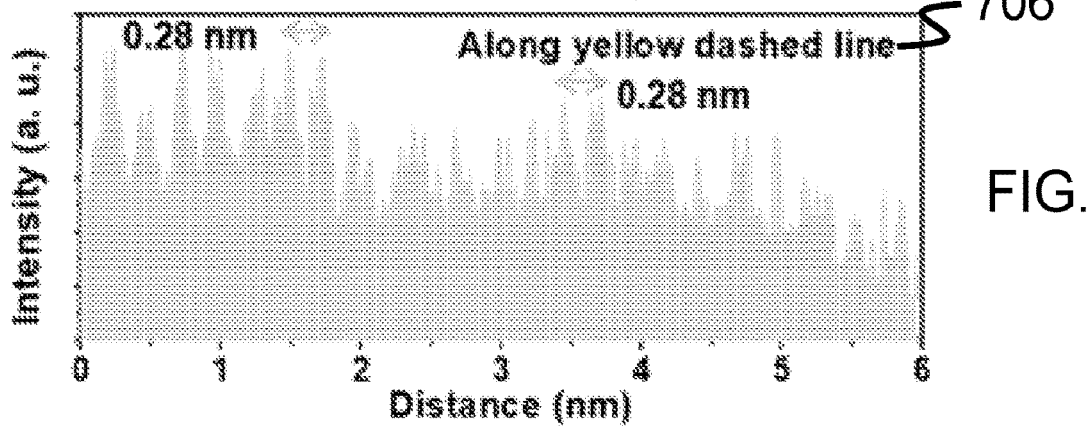

The microphase changes of degraded and regenerated samples were carefully examined by high-resolution transmission electron microscopy (HRTEM), as illustrated in the HRTEM images of the degraded sample in FIG. 7A and the regenerated sample in FIG. 7B. The MS-SA 4 h sample was selected as the representative regenerated sample for the microscopic characterization due to its lower cation mixing. More than 10 particles were examined for each sample. FIGS. 7C-7J show the data of representative particles. The degraded NCM523 particles clearly showed rock salt phase existed near the surface region (FIG. 7C) and layered phase in the bulk region (FIG. 7D). The characteristic spots in FFT pattern of rock salt phase can be indexed as (1$\overline{1}$1), (002) and ($\overline{1}$11) plane in the zone axis of [110]. As expected, the intensity profile exhibits periodic contrast along the TM layer 702, 704, 706, 708 from the surface to the bulk in both the degraded sample (FIG. 711) and regenerated sample (FIG. 7J) with a nearest atomic column distance around 0.28 nm. However, the intensity profile of the degraded sample along the Li layer shows much higher intensity on the surface, which indicates the presence of a blocking layer 710 due to the existence of TM at the Li layer (FIG. 7G). It has been demonstrated that the migration of TM to the Li layer during cycling can block the $Li^+$ transport, resulting in capacity degradation. After regeneration (FIG. 7B), only the layered phase was observed on the surface (FIG. 7E) and in the bulk (FIG. 7F). Consistently, the intensity profile along the Li layer exhibits uniform contrast both on the surface and in the bulk (FIG. 7I), which proves that the rock-salt phase was eliminated after regeneration and the layered phase was successfully recovered.

Figure 8A:
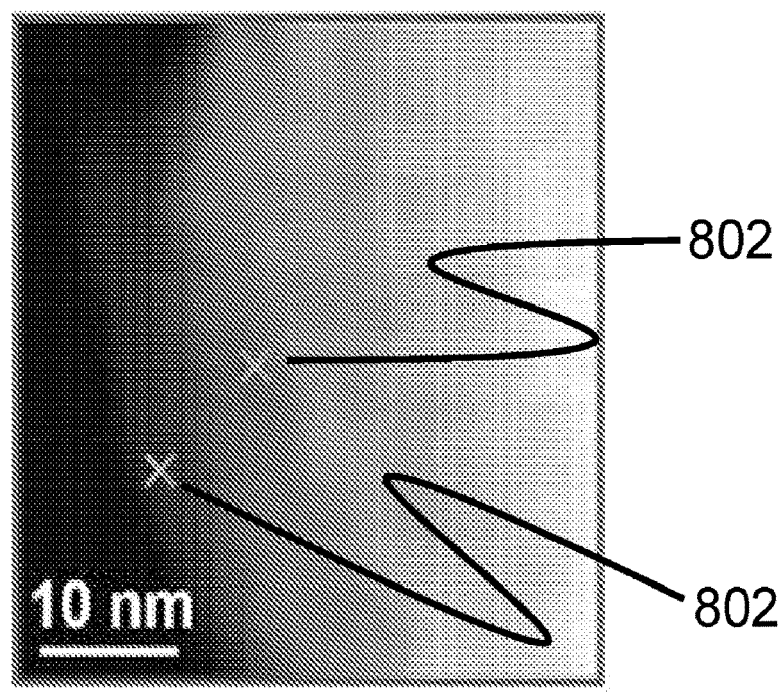
FIGS. 8A and 8B are scanning transmission electron microscope (STEM) images after electron energy loss spectroscopy (EELS) analysis of the degraded and regenerated NCM particles, respectively, according to one embodiment of the invention.
Figure 8B:
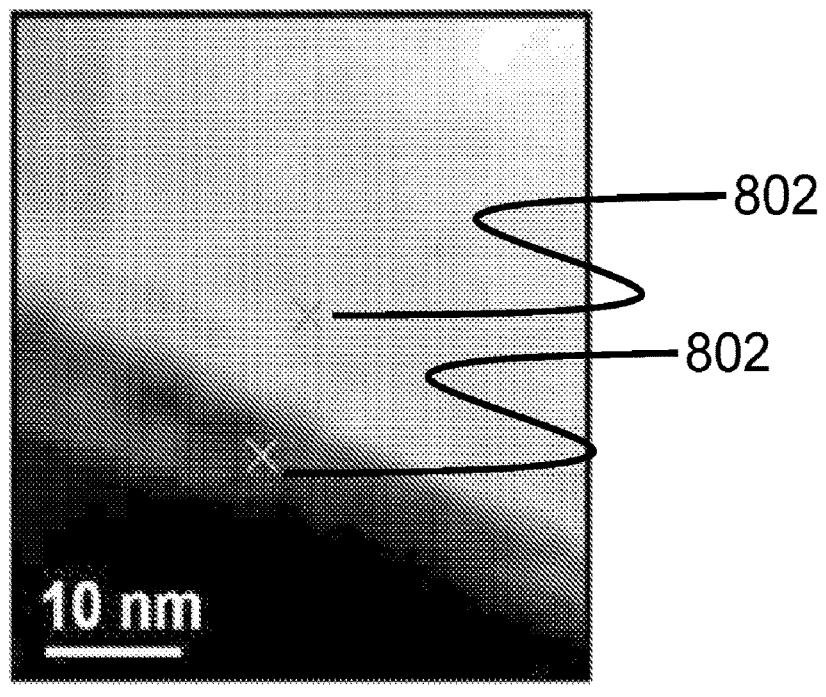
Figure 8C:
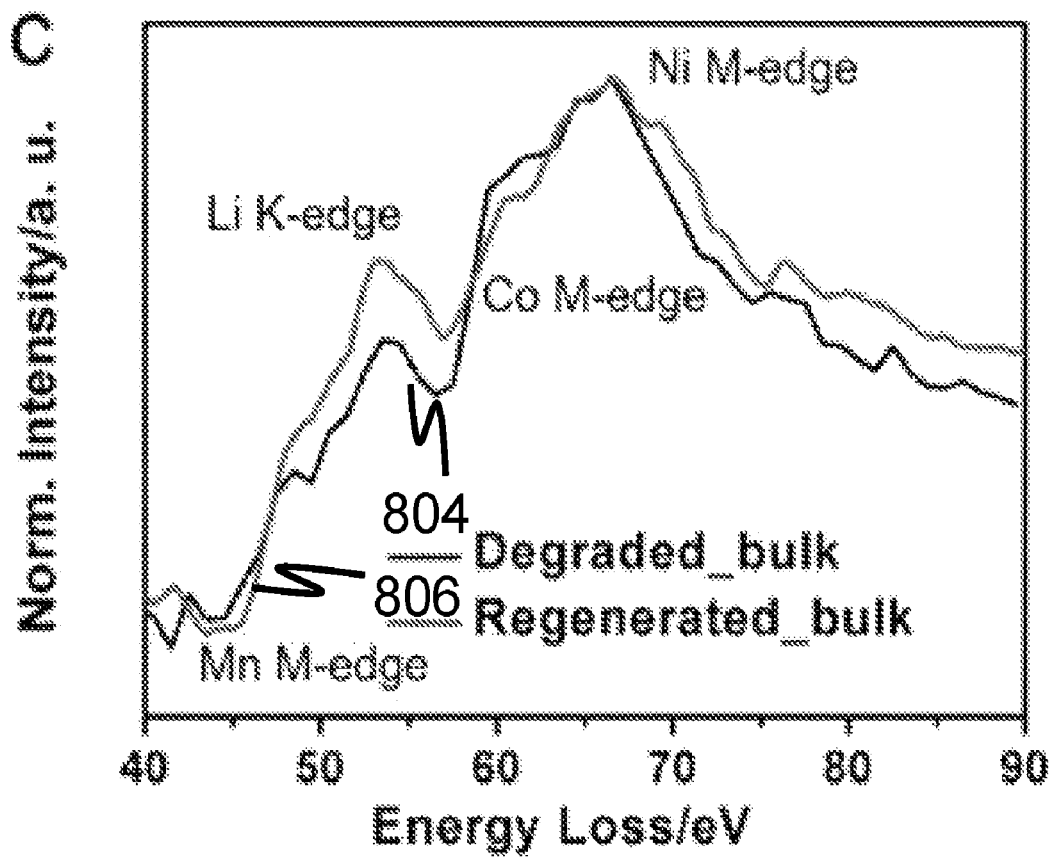
FIG. 8C is a graph illustrating a plot of a low-loss region of EELS for the bulk of degraded and regenerated NCM particles, according to one embodiment of the invention.

To examine the oxidation state of the TM ions on the surface and in the bulk, electron energy loss spectroscopy (EELS) was performed on the degraded and regenerated samples, as illustrated by the scanning transmission electron microscope (STEM) images in FIG. 8A and FIG. 8B, respectively, with the cross symbol 802 (x) indicating the positions of measurement. Note that all the EELS spectra were normalized to Ni M-edge in the low-loss region and O K-edge in the high-loss region. As illustrated in FIG. 8C, a comparison of the Li K-edge spectra in the bulk of degraded 804 and regenerated 806 NCM523 samples shows a much higher Li content after regeneration, which is consistent with the inductively coupled plasma atomic emission spectroscopy (ICP-OES) results. The broad structures of O K-edge above 534 eV (808 in FIG. 8D) correspond to the transition of O 1s to the hybridized states, consisting of TM 4sp and oxygen 2p orbitals. The pre-edge structure 810 below 534 eV corresponds to the transition to the states of TM 3d and oxygen 2p orbitals. The intensity ratio of the 3d to 4sp band represents the amount of unoccupied 3d orbitals in the TM ions and a change in the local environment of oxygen. The decrease of pre-edge structure of the degraded sample suggests the change of bond covalency between oxygen and the neighboring TM which is due to the formation of Ni—O like rock-salt structure on the surface of the material.

Figures 8D, 8E:
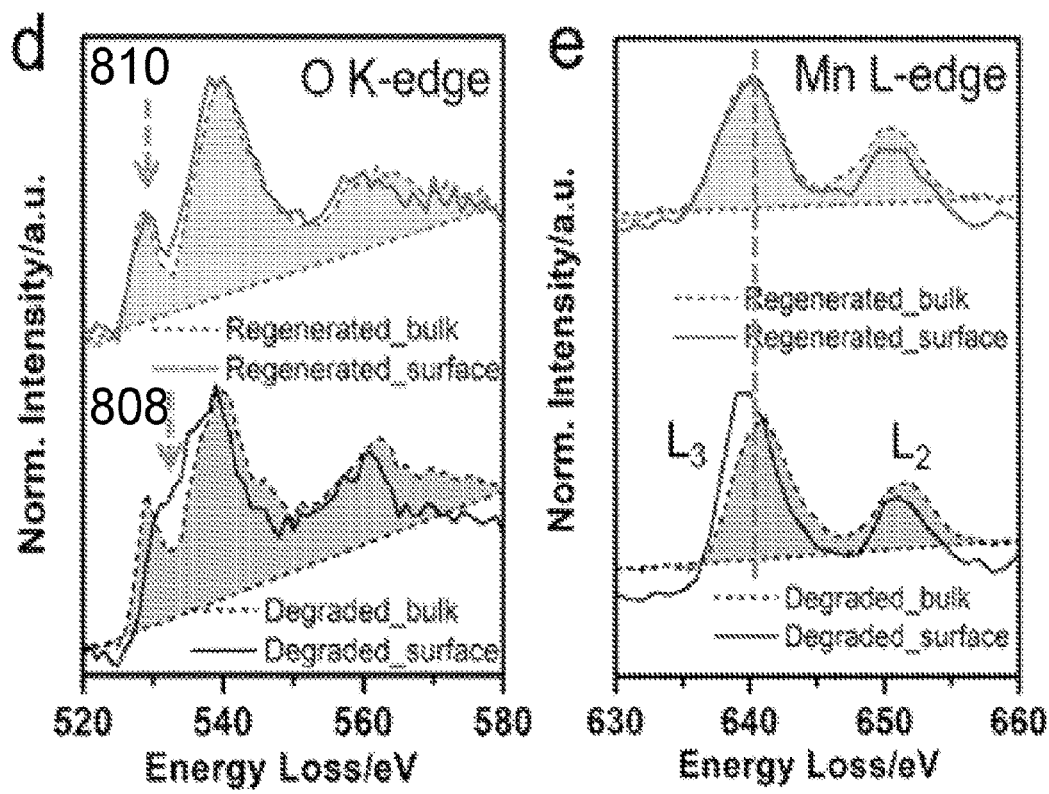
FIGS. 8D-8G are graphs illustrating plots of the EELS comparisons of the surface and bulk in the degraded and regenerated samples for O K-edge, Mn L-edge, Co L-edge, and Ni L-edge, respectively, according to one embodiment of the invention.
Figures 8F, 8G:
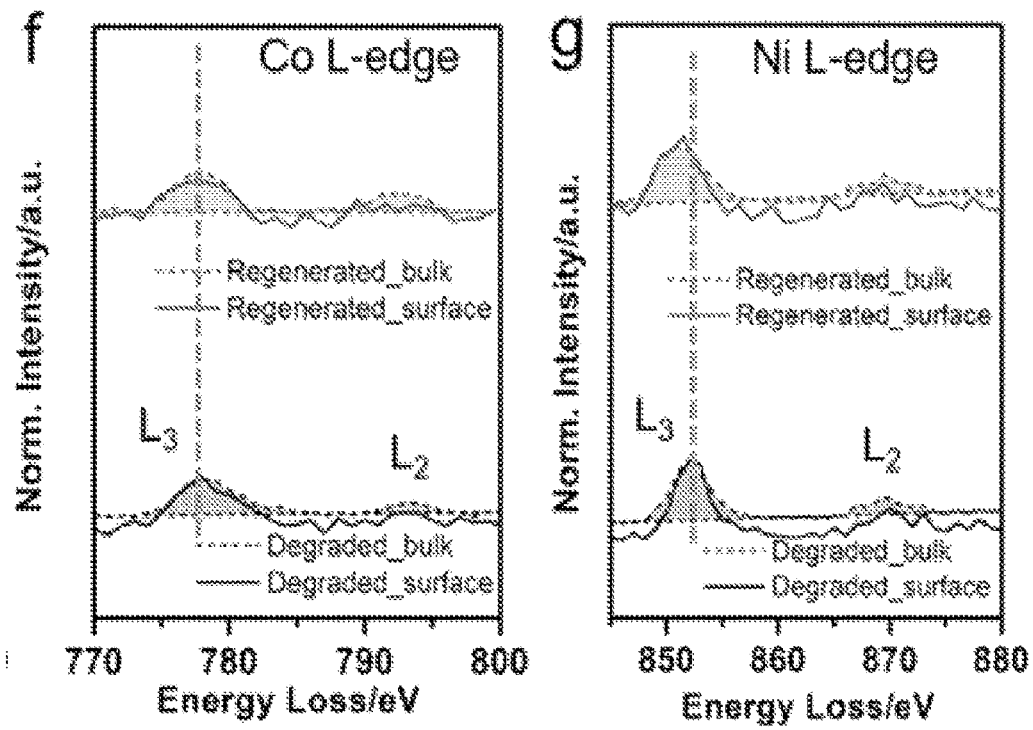

In the regenerated sample, no obvious difference of pre-edge structure was observed from the surface to the bulk, as illustrated in FIG. 8D, which once again manifests the surface structure recovery. As shown in FIG. 8E, the differences in the Mn L-edge spectra of degraded and regenerated samples are also obvious. In the degraded sample, the red shift of the absolute energy onset on the surface compared to the bulk together with a higher $L_3/L_2$ ratio on the surface than that in the bulk suggests a lower oxidation state of Mn on the surface due to the surface oxygen loss during cycling. The regenerated sample shows similar Mn L-edge peaks on the surface and in the bulk, which suggests that the oxidation state of Mn is identical from the surface to the bulk after regeneration. In FIG. 8F, the oxidation states of Co are similar on both the surface and in the bulk, as well as in degraded and regenerated samples, which is evidenced from similar peak positions and intensities of Co L-edge spectra in all the samples. In Ni L-edge spectra illustrated in FIG. 8G, the regenerated sample shows lower oxidation state than the degraded sample, which is attributed to the charge compensation due to re-dosed Li after regeneration.

Figure 9A:
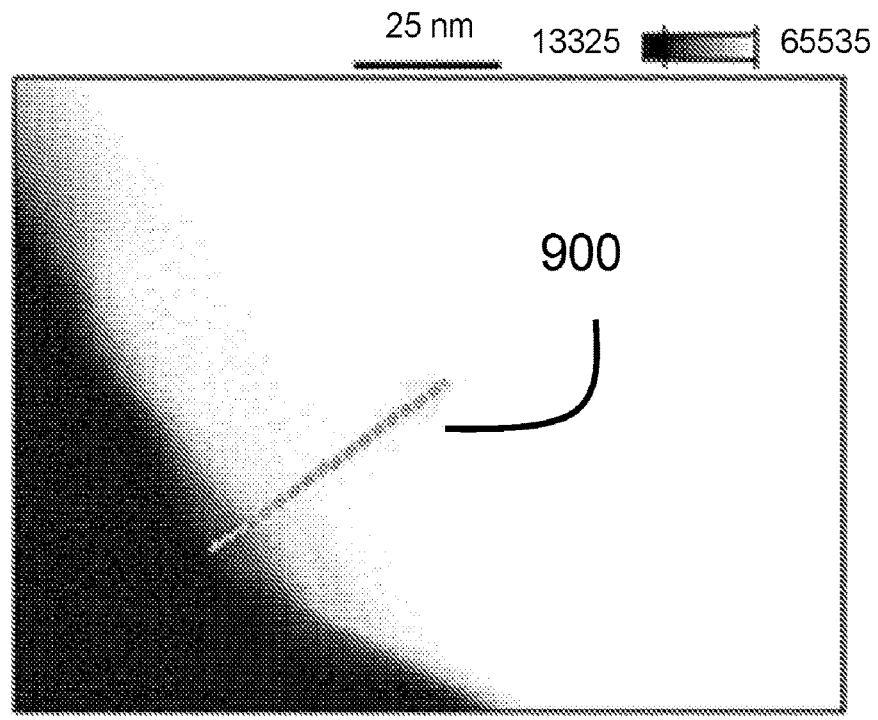
FIGS. 9A-9D are images of scanning transmission electron microscope (STEM)/energy-dispersive X-ray (EDX) mapping of degraded NCM cathode material, according to one embodiment of the invention.
Figure 9B:
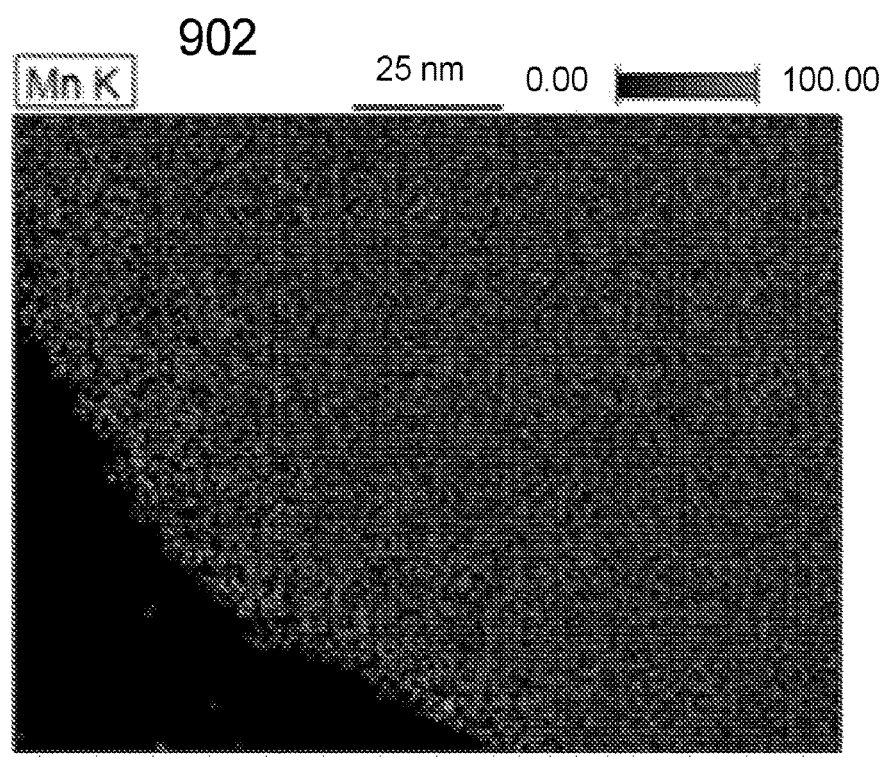
Figure 9C:
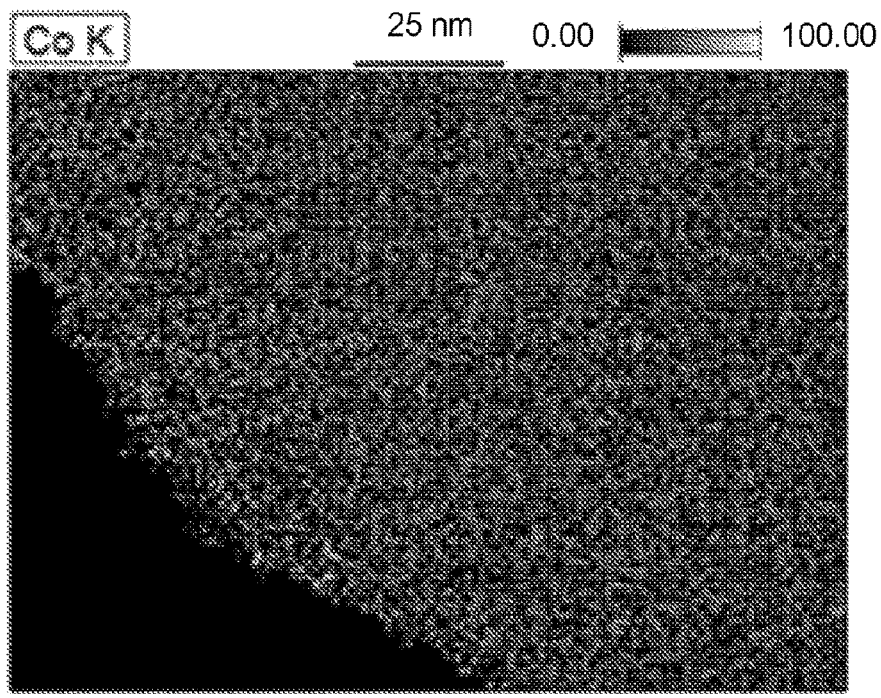
Figure 9D:
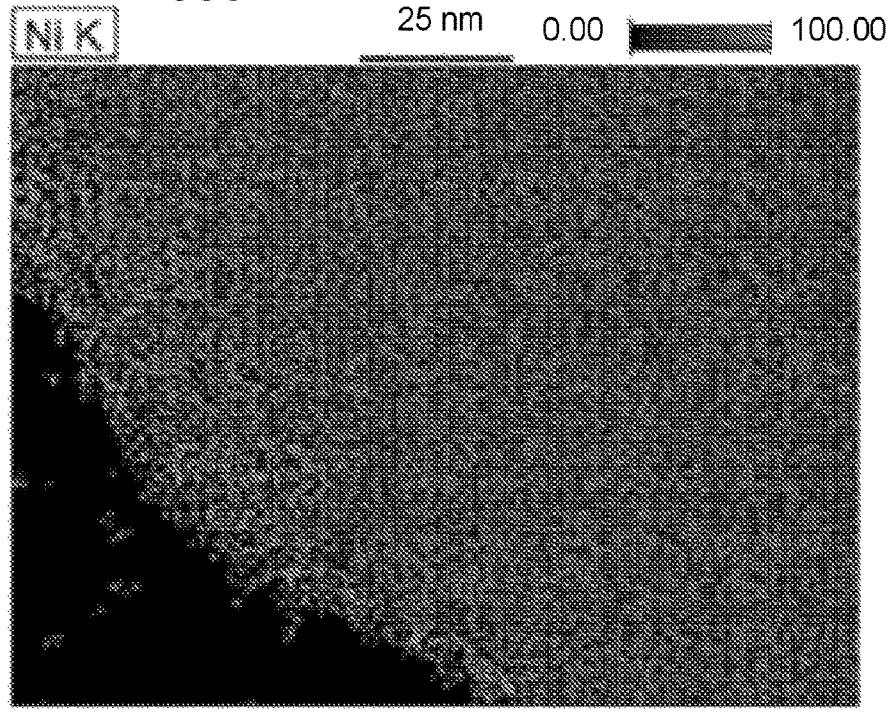
Figure 9E:
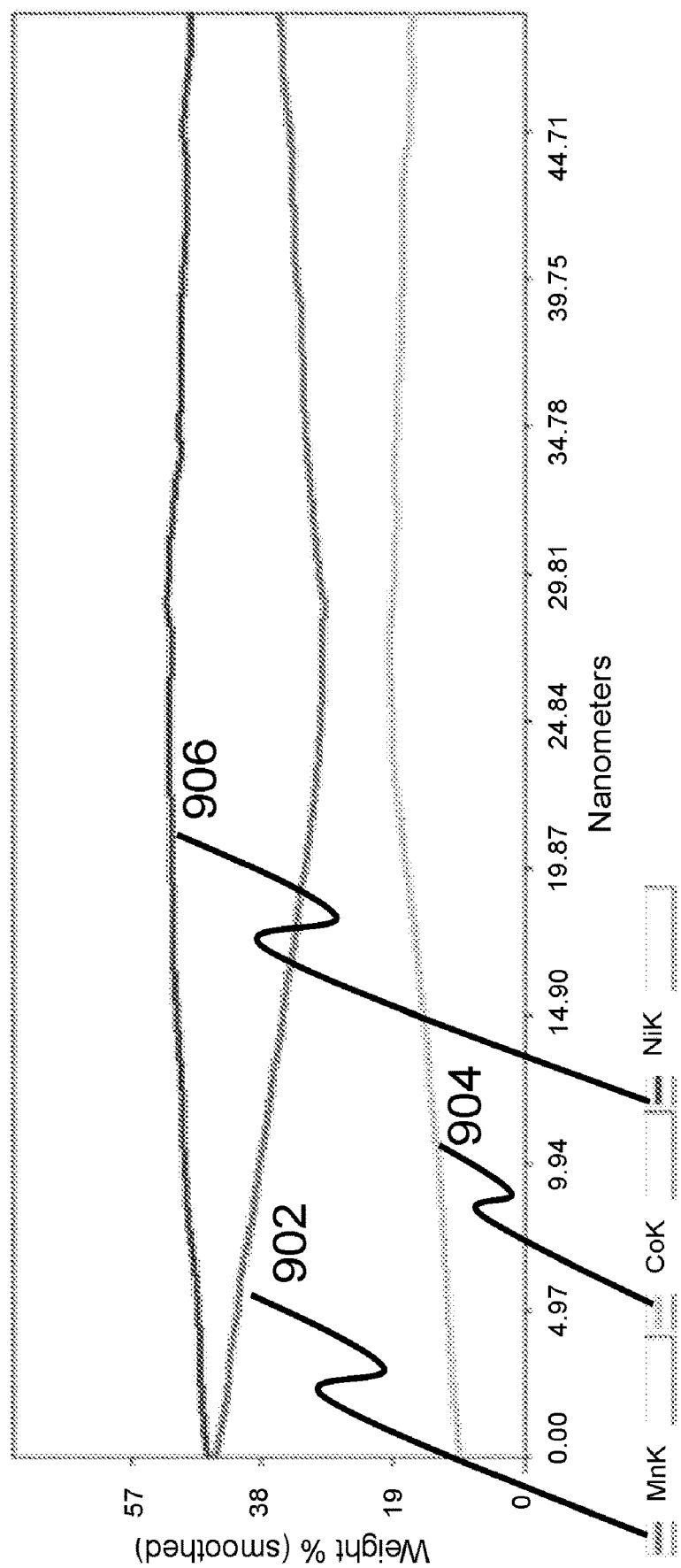
FIG. 9E is a graph of transition metal (TM) distributions obtained from the STEM/EDX mapping of the degraded NCM cathode material, according to one embodiment of the invention.
Figure 10A:
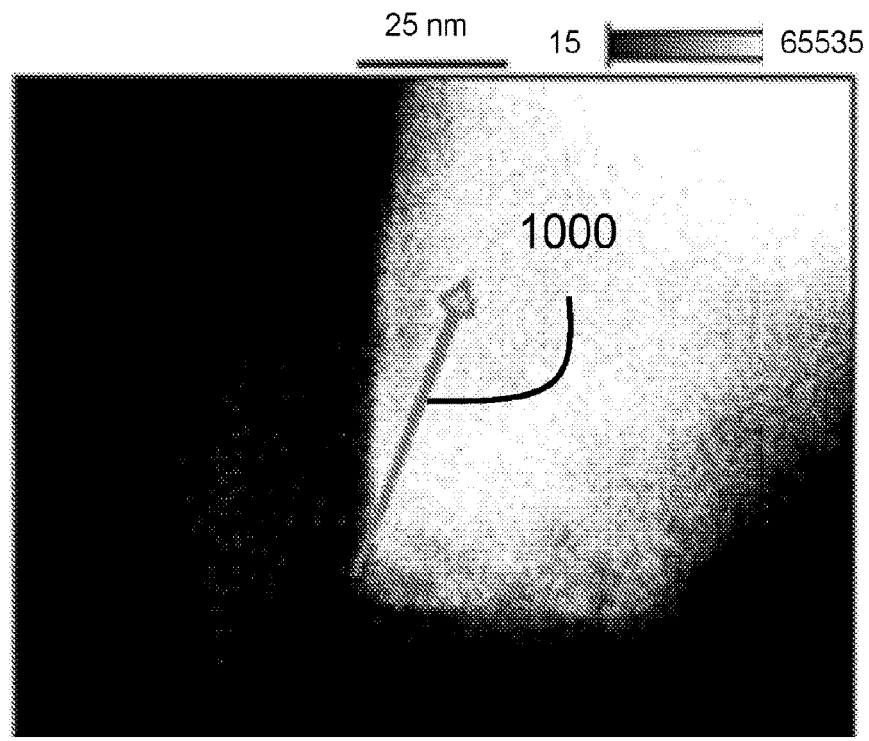
FIGS. 10A-10D are images of STEM/EDX mapping of NCM cathodes relithiated for approximately 4 hours, according to one embodiment of the invention.
Figure 10B:
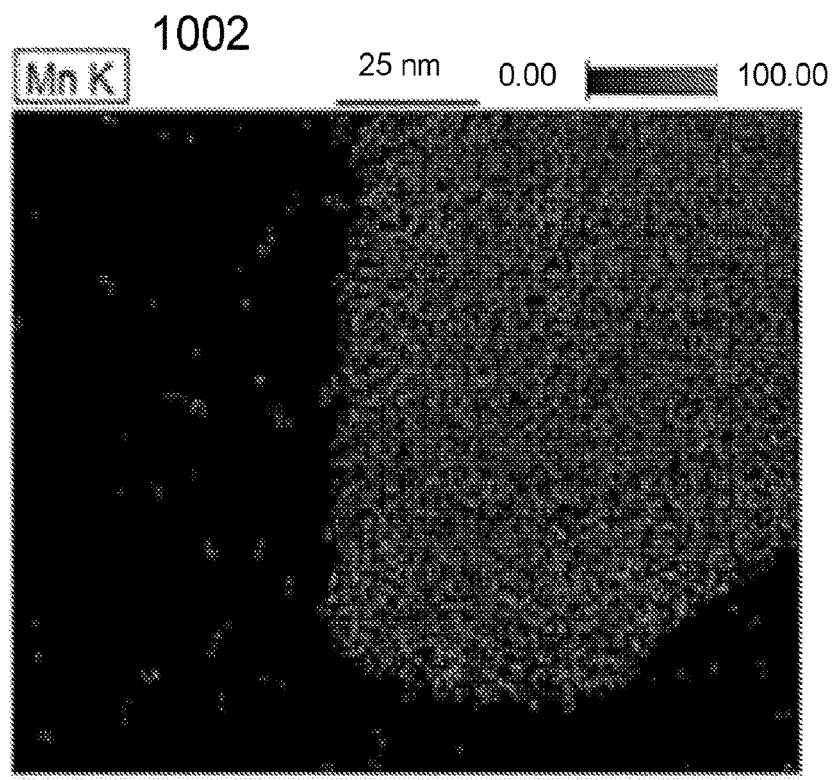
Figure 10C:
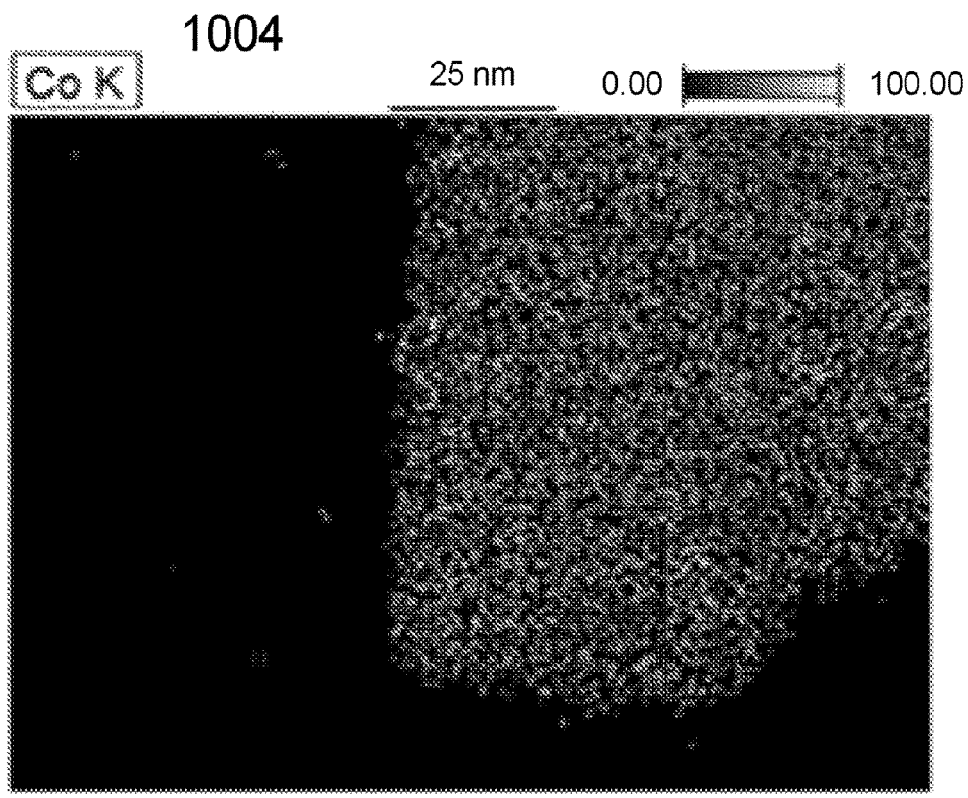
Figure 10D:
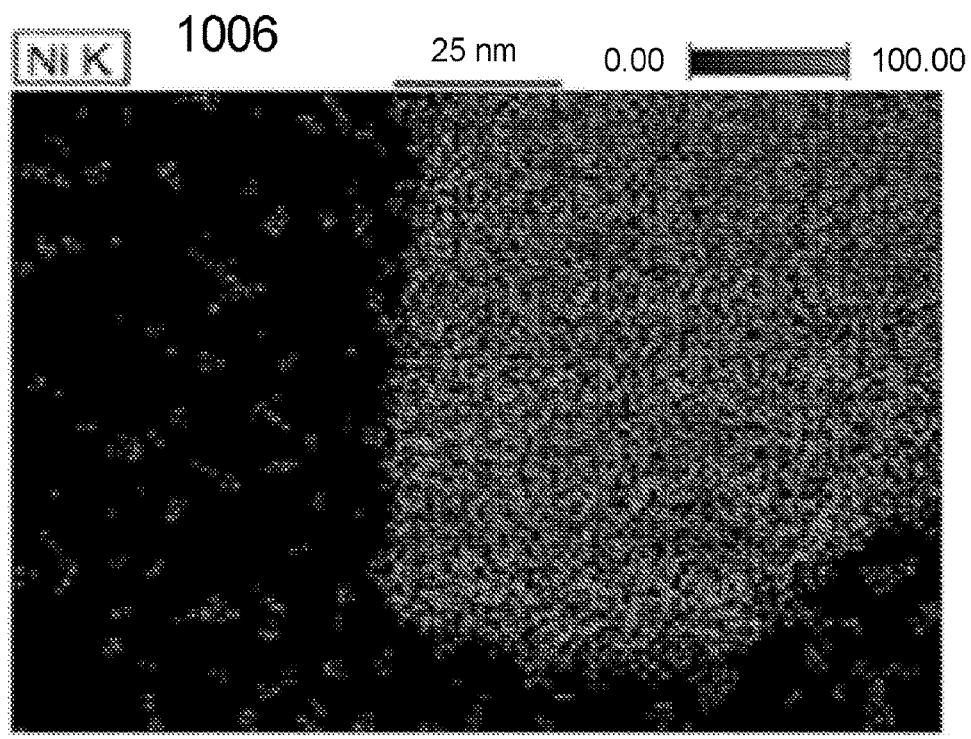
Figure 10E:
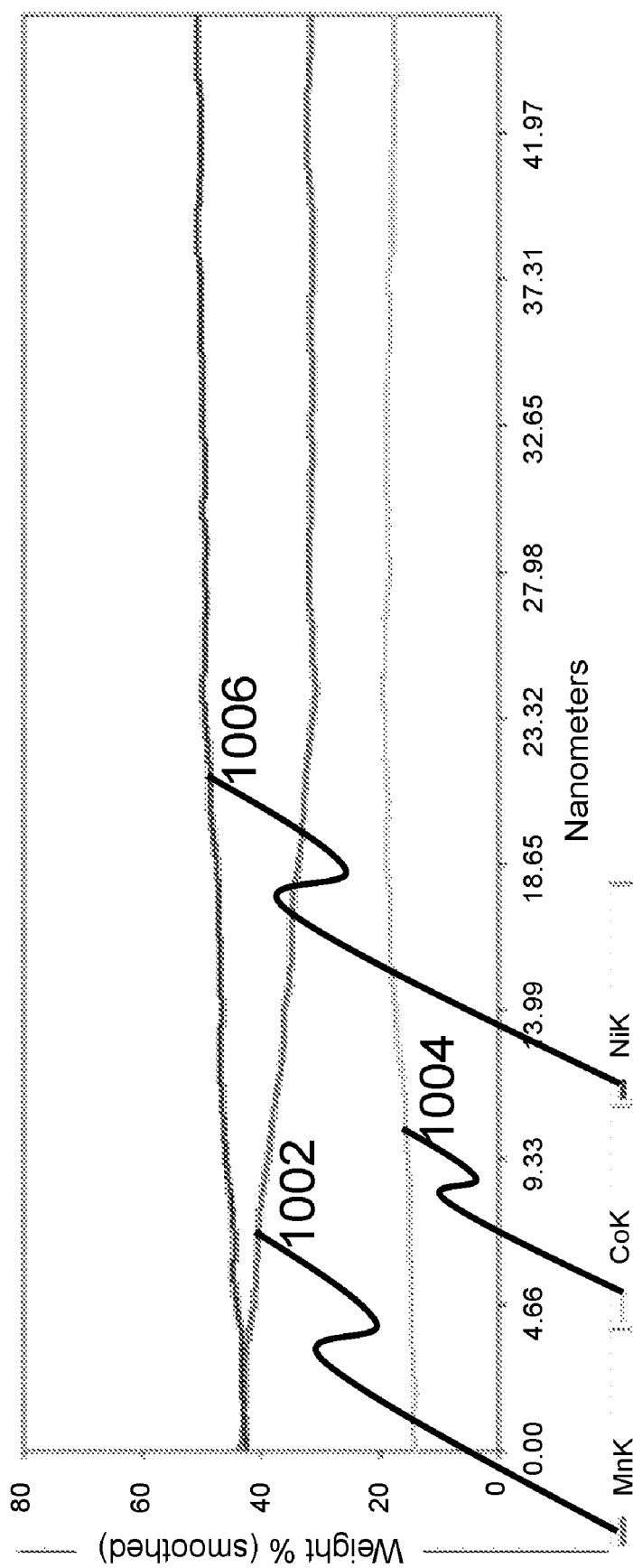
FIG. 10E is a graph of transition metal (TM) distributions obtained from the STEM/EDX mapping of the regenerated NCM cathode material, according to one embodiment of the invention.

To investigate whether the regeneration process changed the TM distributions, STEM/energy-dispersive X-ray (EDX) mapping 900/1000 was performed on the degraded NCM523 cathode samples (902, 904, 906) and the regenerated NCM523 samples (1002, 1004, 1006), as illustrated in FIGS. 9A-9D and FIGS. 10A-10D, respectively, with respective graphs of the Mn K 902/1002, Co K 904/1004 and Ni K 906/1006 mappings illustrated in FIG. 9E and FIG. 10E. Both the degraded and regenerated samples showed similarly uniform TM distribution, suggesting that the regeneration procedure has neglectable contribution to the TM distribution.

Figure 11A:
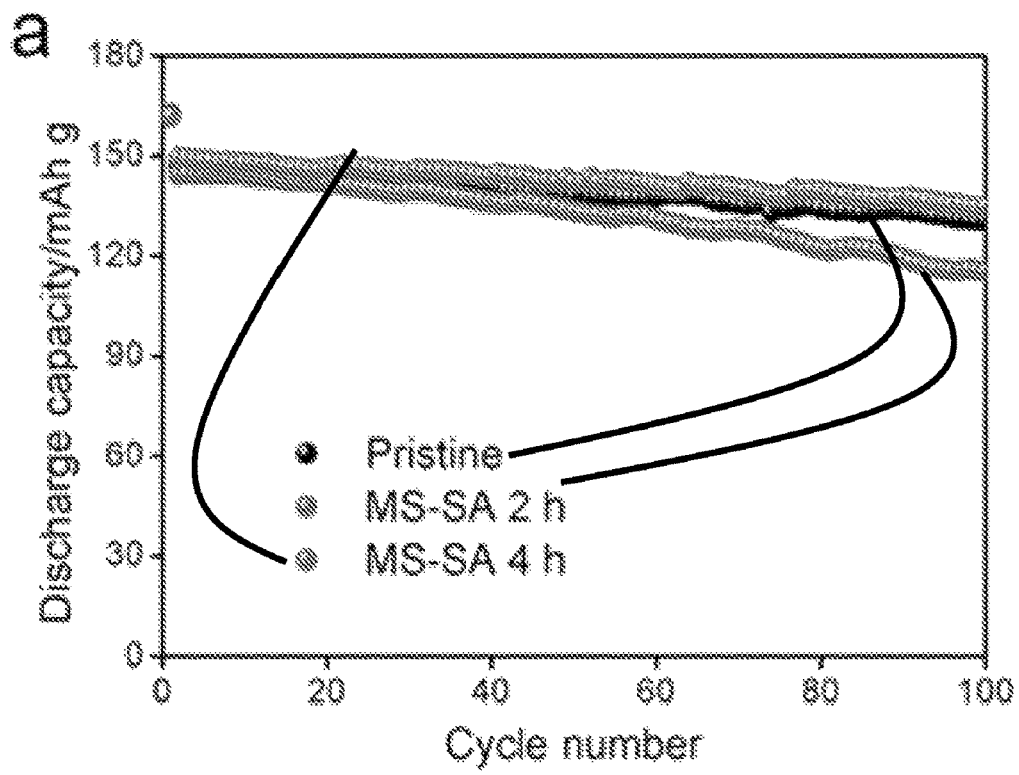
FIG. 11A is a graph plot showing a cycling performance of pristine and regenerated cathodes, according to one embodiment of the invention.
Figure 11B:
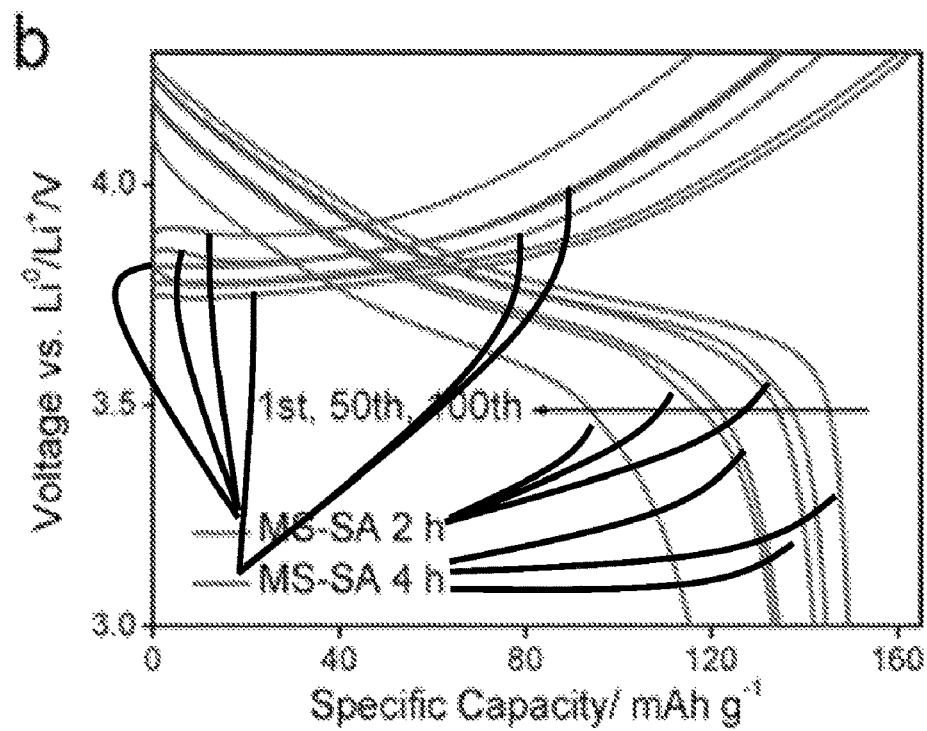
FIG. 11B is a graph showing voltage-capacity profiles of regenerated cathodes at different cycles, according to one embodiment of the invention.
Figure 11C:
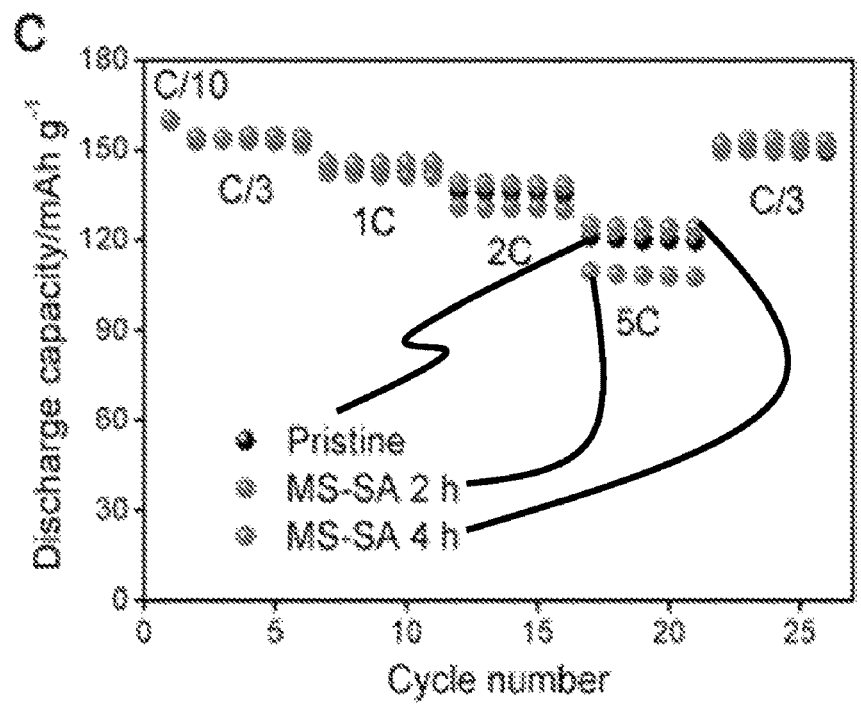
FIG. 11C is a graph showing a rate performance of pristine and regenerated cathodes.
Figure 11D:
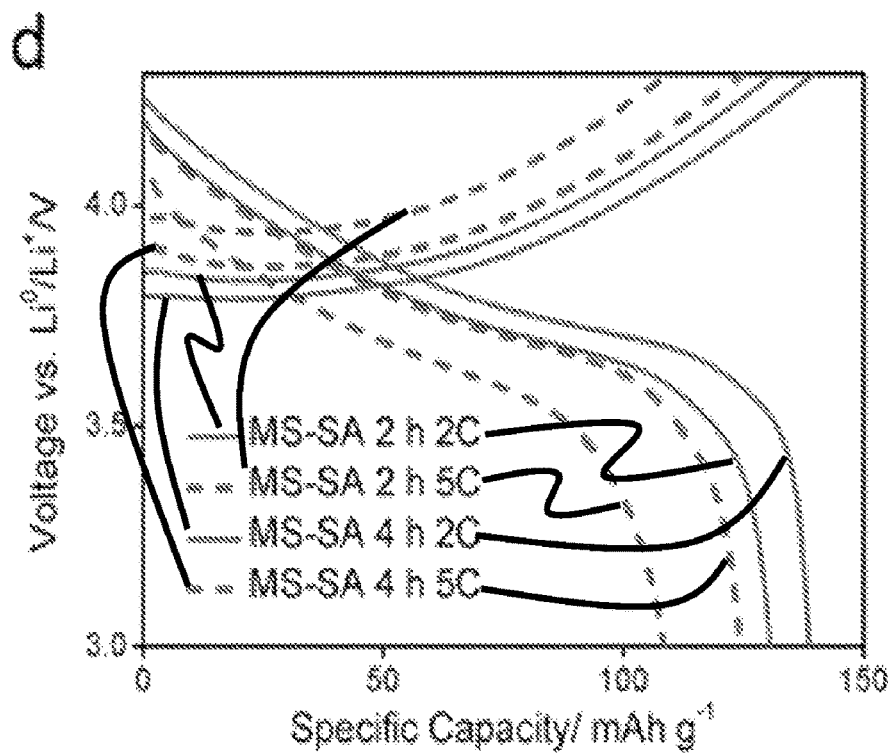
FIG. 11D is a graph showing voltage-capacity profiles of regenerated cathodes at different rates.

FIG. 11A illustrates the charge/discharge cycling performance of the pristine and regenerated NCM523 cathode particles in a voltage range of 3-4.3 V at 1 C (C=150 mA $g^{-1}$) after one activation cycle at a rate of C/10, while FIG. 11B illustrates a comparison of the voltage-capacity profiles at different cycles. The pristine cathode shows a capacity of 146.6 mAh $g^{-1}$ in the first cycle at 1 C and 130.4 mAh $g^{-1}$ after 100 cycles. Although the original graphite/NCM523 pouch cells were cycled to induce ~48% of capacity degradation with 40% of $Li^+$ loss in the cathodes, the electrochemical activity and cycling stability of the regenerated NCM523 cathodes can be fully recovered. The MS-SA 4 h sample shows a capacity of 149.3 mAh $g^{-1}$ in the first cycle at 1 C and 134.6 mAh $g^{-1}$ after 100 cycles. This performance is even slightly better than the original NCM523 sample, possibly due to the reduced cation mixing the in bulk of the cathode particles after uniform relithiation. The MS-SA 2 h sample has inferior cycling stability and large voltage drop at the beginning of discharge cycles, which is due to its higher Li/Ni cation mixing: the higher charge of $Ni^{2+}$ can lead to a stronger electrostatic repulsion of the migrating of $Li^+$, and disordered Li slab are more contracted in distance, making $Li^+$ diffusion more difficult. As shown by the rate performance graph in FIG. 11C, the MS-SA 4 h sample shows good rate capability, similar with that of the pristine sample, while the MS-SA 2 h sample has inferior rate capability. FIG. 11D illustrates the voltage-capacity profiles of regenerated cathodes at different rates. For example, MS-SA 4 h sample has a discharge capacity of 124.4 mAh $g^{-1}$ at 5 C, while MS-SA 2 h sample only has a capacity of 108.4 mAh $g^{-1}$ at 5 C. The better rate performance of the MS-SA 4 h sample is attributed to its lower $Li^+$ migration barrier.

Testing of the inventive techniques demonstrated the efficacy of ambient-pressure relithiation of degraded, lithium-deficient NCM particles via a eutectic $Li^+$ molten-salt solutions. By combining such a low-temperature molten-salt relithiation process with a short-time thermal annealing step, NCM cathode particles with significant capacity degradation and Li loss can be successfully regenerated to achieve their original chemical composition and crystal structures. As a result, the Li storage capacity, cycling stability and rate capability of the degraded cathodes can be recovered to the original levels of the pristine materials, suggesting the promise of using this new method to recycle and remanufacture degraded NCM cathode materials.

In other embodiments, this method can be extended and applied to regenerate other LIB cathode materials such as $LiMn_2O_4$, $LiFePO_4$, lithium cobalt oxide, lithium manganese oxide, lithium iron phosphate, lithium nickel oxide, lithium nickel cobalt aluminum oxide, lithium nickel cobalt oxide, lithium nickel manganese oxide, lithium nickel aluminum oxide, $xLi_2MnO_3(1-x)LiMO_2$ (M=Nickel, Cobalt, Manganese), as well as sodium-ion battery cathodes (e.g. $Na(Ni_{0.60}Co_{0.05}Mn^{0.35})O_2$), though the exact details of the treatment may vary depending on the cathode structures and chemistries. In addition, this work may also provide a unique platform to further study reversible chemistry in various solid-state ionic materials to develop green synthetic strategies for energy materials.

The following examples provide illustrative details regarding processes, protocols and test results according to embodiments of the inventive approach.

Example 1: Pouch Cells Assembly and Cathode Materials Harvesting

Dry pouch cells (220 mAh) with NCM523 as the cathode and graphite as the anode were purchased from Li-Fun Technology (Xinma Industry Zone, Golden Dragon Road, Tianyuan District, Zhuzhou City, Hunan Province, PRC, 412000). Electrolyte was filled in and the pouch cell was sealed by a vacuum sealer (MTI corporation) in argon-filled glovebox. The electrolyte (LP40) was 1M $LiPF_6$ in ethylene carbonate (EC) and diethyl carbonate (DEC) with a weight ratio of 1:1. After formation at C/10 (C=150 mA $g^{-1}$) for the first cycle, the pouch cells were cycled in the voltage range of 3-4.5 V at 1 C for 400 cycles to induce capacity decay. All pouch cells were discharged to 2 V at C/10 before disassembly.

To harvest NCM523 cathode particles, the cathode strips were harvested from the pouch cell, thoroughly rinsed by dimethyl carbonate and soaked in N-Methyl-2-pyrrolidone (NMP) followed by sonication. The active materials, binder and carbon black (CB) were removed from the aluminum substrate. The suspension was centrifuged and the active materials were precipitated. The precipitation was washed several times and the active materials were harvested and dried. CB has much lower density than NCM523 and can be separated by gravity during the precipitation process.

Example 2: Regeneration of Cathode Materials

Degraded NCM523 materials were mixed with an excess amount of a eutectic Li salt mixture which was composed of $LiNO_3$ and LiOH in a molar ratio of 3:2. The mixture was heated at 300° C. for 2 h or 4 h for relithiation, and then washed with deionized water to remove the residue Li salts. The relithiated NCM523 was sintered together with 5% excess amount of $Li_2CO_3$ (to compensate Li loss at high temperature) at 850° C. in oxygen for 4 h. The temperature ramping rate was 5° C./min.

Example 3: Characterization of Materials

The composition of pristine, degraded and regenerated NCM523 cathode was measured by an Inductively Coupled Plasma Optical Emission Spectrometer (ICP-OES, Perkin Elmer Optima 3000 DV). Differential scanning calorimetry (DSC) analysis of pure degraded NCM523 powder, as well as the mixture of degraded NCM523 and the eutectic Li salts was carried out from room temperature to 500° C., using a Perkin Elmer Diamond DSC. Thermogravimetric analysis (TGA) of the mixture of degraded NCM523 and the eutectic Li salts was performed in the same temperature range with DSC analysis, using Perkin Elmer Pyris 1 TGA. Both DSC and TGA tested were carried out with a temperature ramping rate of 5° C./min. The crystal structure of all the cathode powder was examined by X-ray Powder Diffraction (XRD) employing Cu Kα radiation.

Example 4: Electrochemical Characterization

To prepared electrodes, the pristine, cycled and regenerated NCM523 cathode materials were mixed with polyvinylidene difluoride (PVDF) binder, and Super P65 at a mass ratio of 8:1:1 in NMP to form slurries. The slurries were cast on aluminum foil using a doctor blade and then dried in vacuum at 80° C. for 6 h. Disc-shape electrodes were cut and compressed by a rolling mill. The active mass loading was about 3 mg/cm$^2$. Type-2016 coin cells were assembled with Li metal disc (thickness: 1.1 mm) as the anode, 1 M $LiPF_6$ in EC:DEC (1:1 wt.) as the electrolyte, and trilayer membrane (Celgard 2320) as the separator. Galvanostatic charge-discharge was carried out using a LAND battery testing system in the potential range of 3-4.3 V at 1 C after C/10 activation in the initial cycle.

Example 5: Microscopic Characterization

High-resolution transmission electron microscopy (HR-TEM) was recorded on a field emission gun JEOL-2800 at 200 kV with Gatan OneView Camera (full 4 K*4 K resolution). Scanning transmission electron microscopy-energy dispersive X-Ray spectroscopy (STEM-EDS) was performed on primary particles using a JEOL JEM-2800 at annular dark field (ADF) mode. All ADF images were acquired at 200 kV with a beam size of ~5 Å. STEM-electron energy loss spectroscopy (EELS) was performed on JEOL JEM-ARM300CF at 300 kV, equipped with double correctors. To minimize possible electron beam irradiation effects, EELS spectra were acquired from areas without pre-beam irradiation.

REFERENCES (INCORPORATED HEREIN BY REFERENCE)

[1] T. Placke, R. Kloepsch, S. Dühnen, M. Winter, *J. Solid State Electrochem.* 2017, 21, 1939.
[2] P. Meister, H. Jia, J. Li, R. Kloepsch, M. Winter, T. Placke, *Chem. Mater.* 2016, 28, 7203.
[3] B. Nykvist, F. Sprei, M. Nilsson, *Energy Policy* 2019, 124, 144.
[4] T. C. Wanger, *Conserv. Lett.* 2011, 4, 202.
[5] S. Natarajan, V Aravindan, *Adv. Energy Mater.* 2018, 8, 1802303.
[6] X. Zhang, L. Li, E. Fan, Q. Xue, Y. Bian, F. Wu, R. Chen, *Chem. Soc. Rev.* 2018, 47, 7239.
[7] A. Kwade, W. Haselrieder, R. Leithoff, A. Modlinger, F. Dietrich, K. Droeder, *Nat. Energy* 2018, 3, 290.
[8] G. Berckmans, M. Messagie, J. Smekens, N. Omar, L. Vanhaverbeke, J. Van Mierlo, *Energies* 2017, 10, 1314.
[9] W. Lv, Z. Wang, H. Cao, Y. Sun, Y Zhang, Z. Sun, *ACS Sustainable Chem. Eng.* 2018, 6, 1504.
[10] X. Z. Li Li, Matthew Li, Renjie Chen, Feng Wu, Khalil Amine, Jun Lu, *Electrochem. Energy Rev.* 2018, 1, 461.
[11] L. Gaines, *Sustainable Mater. Technol.* 2018, 17, e00068.
[12] Y. Shi, G. Chen, Z. Chen, *Green Chem.* 2018, 20, 851.
[13] Y. Shi, G. Chen, F. Liu, X. Yue, Z. Chen, *ACS Energy Lett.* 2018, 3, 1683.
[14] Y. Shi, M. Zhang, C. Fang, Y. S. Meng, *J. Power Sources* 2018, 394, 114.
[15] Q. Zhang, R. E. White, *J. Power Sources* 2008, 179, 793.
[16] F. Holtstiege, A. Wilken, M. Winter, T. Placke, *Phys. Chem. Chem. Phys.* 2017, 19, 25905.
[17] J. Xu, R. D. Deshpande, J. Pan, Y. T. Cheng, V. S. Battaglia, *J. Electrochem. Soc.* 2015, 162, A2026.
[18] Y. Koyama, H. Arai, I. Tanaka, Y. Uchimoto, Z. Ogumi, *Chem. Mater.* 2012, 24, 3886.
[19] W. Liu, P. Oh, X. Liu, M. J. Lee, W. Cho, S. Chae, Y. Kim, J. Cho, *Angew. Chem. Int. Ed.* 2015, 54, 4440.
[20] M. M. Rahman, J. Z. Wang, M. F. Hassan, S. Chou, D. Wexler, H. K. Liu, *J. Power Sources* 2010, 195, 4297.
[21] Z. Yang, S. V. Garimella, *Appl. Energy* 2010, 87, 3322.
[22] D. Brosseau, J. W. Kelton, D. Ray, M. Edgar, K. Chisman, B. Emms, *J. Sol. Energy Eng.* 2005, 127, 109.
[23] D. Kundu, R. K. Debnath, A. Majee, A. Hajra, *Tetrahedron Lett.* 2009, 50, 6998.
[24] L. Wen, Q. Lu, G. X. Xu, *Electrochim. Acta* 2006, 51, 4388.
[25] M. V Reddy, G. V. S. Rao, B. V. R. Chowdari, *J. Power Sources* 2006, 159, 263.
[26] Z. R. Chang, X. Yu, H. W. Tang, X. Z. Yuan, H. Wang, *Powder Technol.* 2011, 207, 396.
[27] Z. Wang, S. Zeng, J. Guo, T. Qin, *PLoS ONE* 2018, 13, e0200169.
[28] D. Liu, W. Xie, H. Liao, Y. Peng, *IEEE Trans. Instrum. Meas.* 2015, 64, 660.

[29] S. J. Harris, D. J. Harris, C. Li, *J. Power Sources* 2017, 342, 589.
[30] X. Han, M. Ouyang, L. Lu, J. Li, *Energies* 2014, 7, 4895.
[31] R. Hausbrand, G. Cherkashinin, H. Ehrenberg, M. Gröting, K. Albe, C. Hess, W. Jaegermann, *Mater. Sci. Eng. B* 2015, 192, 3.
[32] S. K. Jung, H. Gwon, J. Hong, K. Y. Park, D. H. Seo, H. Kim, J. Hyun, W. Yang, K. Kang, *Adv. Energy Mater.* 2014, 4, 1300787.
[33] B. Garcia, S. Lavallée, G. Perron, C. Michot, M. Armand, *Electrochim. Acta* 2004, 49, 4583.
[34] K. Kubota, H. Matsumoto, *ECS Trans.* 2016, 73, 95.
[35] V Giordani, D. Tozier, H. Tan, C. M. Burke, B. M. Gallant, J. Uddin, J. R. Greer, B. D. McCloskey, G. V. Chase, D. Addison, *J. Am. Chem. Soc.* 2016, 138, 2656.
[36] World wide web at crct.polymtl.ca/fact/phase_diagram.php?file=LiNO3-LiOH.jpg&dir=FTsalt.
[37] Y. Shi, M. Zhang, D. Qian, Y. S. Meng, *Electrochim. Acta* 2016, 203, 154.
[38] T. Weigel, F. Schipper, E. M. Erickson, F. A. Susai, B. Markovsky, D. Aurbach, *ACS Energy Lett.* 2019, 4, 508.
[39] J. B. Bates, N. J. Dudney, B. J. Neudecker, F. X. Hart, H. P. Jun, S. A. Hackney, *J. Electrochem. Soc.* 2000, 147, 59.
[40] Y. C. Chen, X. J. Xu, H. Z. Cui, K. H. Dai, Z. S. Song, W. J. Jung, L. Qi, *Acta Phys. Chim. Sin.* 2007, 23, 1948.
[41] D. Mohanty, S. Kalnaus, R. A. Meisner, K. J. Rhodes, J. Li, E. A. Payzant, D. L. Wood, C. Daniel, *J. Power Sources* 2013, 229, 239.
[42] D. Mohanty, H. Gabrisch, *J. Power Sources* 2012, 220, 405.
[43] F. Wu, J. Tian, Y. Su, J. Wang, C. Zhang, L. Bao, T. He, J. Li, S. Chen, *ACS Appl. Mater. Interfaces* 2015, 7, 7702.
[44] F. Schipper, E. M. Erickson, C. Erk, J. Y. Shin, F. F. Chesneau, D. Aurbach, *J. Electrochem. Soc.* 2017, 164, A6220.
[45] H. J. Noh, S. Youn, C. S. Yoon, Y. K. Sun, *J. Power Sources* 2013, 233, 121.
[46] S. M. Bak, E. Hu, Y. Zhou, X. Yu, S. D. Senanayake, S. J. Cho, K.-B. Kim, K. Y. Chung, X. Q. Yang, K. W. Nam, *ACS Appl. Mater. Interfaces* 2014, 6, 22594.
[47] B. Qiu, M. Zhang, L. Wu, J. Wang, Y. Xia, D. Qian, H. Liu, S. Hy, Y. Chen, K. An, Y Zhu, Z. Liu, Y. S. Meng, *Nat. Commun.* 2016, 7, 12108.
[48] F. Lin, I. M. Markus, D. Nordlund, T. C. Weng, M. D. Asta, H. L. Xin, M. M. Doeff, *Nat. Commun.* 2014, 5, 3529.
[49] L. Mu, R. Lin, R. Xu, L. Han, S. Xia, D. Sokaras, J. D. Steiner, T. C. Weng, D. Nordlund, M. M. Doeff, Y. Liu, K. Zhao, H. L. Xin, F. Lin, *Nano Lett.* 2018, 18, 3241.
[50] J. Graetz, C. C. Ahn, H. Ouyang, P. Rez, B. Fultz, *Phys. Rev. B* 2004, 69, 235103.
[51] K. Kang, G. Ceder, *Phys. Rev. B* 2006, 74, 094105.

What is claimed is:

1. A method of regenerating lithium-ion battery cathode materials from spent lithium-ion batteries, the method comprising:
    mixing a eutectic molten salt solution with lithium-ion cathode materials to form a mixture;
    heating the mixture at an ambient pressure to relithiate the lithium-ion cathode materials and generate a relithiated mixture; and
    thermally annealing the relithiated mixture.

2. The method of claim 1, wherein the lithium-ion cathode materials comprise lithium nickel cobalt manganese oxide (NCM) with a formula of $LiNi_xCo_yMn_{1-x-y}O_2 (0 \leq x \leq 1, 0 \leq y \leq 1, 0 \leq x+y \leq 1)$.

3. The method of claim 2, wherein the NCM comprises one or more of $LiNi_{0.333}Co_{0.333}Mn_{0.333}O_2$ (NCM111), $LiNi_{0.5}Co_{0.2}Mn_{0.3}O_2$ (NCM523), $LiNi_{0.6}Co_{0.2}Mn_{0.2}O_2$ (NCM622), $LiNi_{0.7}Co_{0.1}Mn_{0.2}O_2$, $LiNi_{0.8}Co_{0.1}Mn_{0.1}O_2$ (NCM811), $LiNi_{0.83}Co_{0.12}Mn_{0.05}O_2$, and $LiNi_{0.89}Co_{0.06}Mn_{0.05}O_2$.

4. The method of claim 1, wherein the eutectic molten salt solution is comprises lithium hydroxide (LiOH) and lithium nitrate ($LiNO_3$).

5. The method of claim 4, wherein the LiOH and $LiNO_3$ are mixed at a molar ratio of 3:2.

6. The method of claim 1, wherein the melting point of the eutectic molten salt solution is 176 degrees Celsius (° C.).

7. The method of claim 1, wherein the mixture is heated to 300° C.

8. The method of claim 7, wherein the mixture is heated for 4 hours.

9. The method of claim 1, further comprising adding 5 percent of lithium (Li) to the mixture to compensate for Li evaporation during the thermal annealing.

10. The method of claim 1, wherein the lithium-ion battery cathode materials comprise one or more of lithium cobalt oxide, lithium manganese oxide, lithium iron phosphate, lithium nickel oxide, lithium nickel cobalt aluminum oxide, lithium nickel cobalt oxide, lithium nickel manganese oxide, lithium nickel aluminum oxide, $xLi_2MnO_3(1-x)LiMO_2$ (M=Nickel, Cobalt, Manganese).

11. The method of claim 1, wherein the relithiated mixture is thermally annealed at a temperature range of 700° C.–950° C. for 1-12 hours.

12. A method for recycling spent alkali metal-ion batteries, comprising:
    harvesting alkali metal-ion cathode materials from spent alkali metal-ion batteries;
    mixing the alkali metal-ion cathode materials with a eutectic molten salt solution to form a mixture;
    heating the mixture at an ambient pressure to restore the alkali metal-ion cathode materials and generate restored cathode materials; and
    thermally annealing the restored cathode materials for a pre-determined period of time.

13. The method of claim 12, wherein the alkali metal-ion cathode materials comprise lithium nickel cobalt manganese oxide (NCM) with a formula of $LiNi_xCo_yMn_{1-x-y}O_2$ $(0 \leq x \leq 1, 0 \leq y \leq 1, 0 \leq x+y \leq 1)$.

14. The method of claim 13, wherein the NCM comprises one or more of $LiNi_{0.333}Co_{0.333}Mn_{0.333}O_2$ (NCM111), $LiNi_{0.5}Co_{0.2}Mn_{0.3}O_2$ (NCM523), $LiNi_{0.6}Co_{0.2}Mn_{0.2}O_2$ (NCM622), $LiNi_{0.7}Co_{0.1}Mn_{0.2}O_2$, $LiNi_{0.8}Co_{0.1}Mn_{0.1}O_2$ (NCM811), $LiNi_{0.83}Co_{0.12}Mn_{0.05}O_2$, and $LiNi_{0.89}Co_{0.06}Mn_{0.05}O_2$.

15. The method of claim 12, wherein the alkali metal-ion cathode materials comprise lithium-ion and the eutectic molten salt solution comprises lithium hydroxide (LiOH) and lithium nitrate ($LiNO_3$).

16. The method of claim 15, wherein the LiOH and $LiNO_3$ are mixed at a molar ratio of 3:2.

17. The method of claim 12, wherein the melting point of the eutectic molten salt solution is 176 degrees Celsius (° C.).

18. The method of claim 12, wherein the mixture is heated to 300° C.

19. The method of claim 18, wherein the mixture is heated for 4 hours.

20. The method of claim 12, wherein the alkali metal-ion cathode materials comprise lithium-ion cathode materials and further comprising adding 5 percent of lithium (Li) to the mixture to compensate for Li evaporation during the thermal annealing.

21. The method of claim 12, wherein the alkali metal-ion cathode materials comprise lithium-ion cathode materials comprising one or more of lithium cobalt oxide, lithium manganese oxide, lithium iron phosphate, lithium nickel oxide, lithium nickel cobalt aluminum oxide, lithium nickel cobalt oxide, lithium nickel manganese oxide, lithium nickel aluminum oxide, $xLi_2MnO_3(1-x)LiMO_2$ (M=Nickel, Cobalt, Manganese).

22. The method of claim 12, wherein the restored cathode materials are thermally annealed at a temperature range of 700° C.-950°° C. for approximately 2-12 hours.

23. The method of claim 12, wherein the alkali metal-ion cathode materials comprise sodium-ion cathode materials.

24. The method of claim 23, wherein the sodium-ion cathode materials comprise $Na(Ni_{0.60}Co_{0.05}Mn_{0.35})O_2$.

* * * * *